US012476546B2

(12) United States Patent
Rmila

(10) Patent No.: US 12,476,546 B2
(45) Date of Patent: Nov. 18, 2025

(54) ISOLATED MULTIPHASE SERIES CAPACITOR CONVERTERS

(71) Applicant: BOARD OF TRUSTEES OF THE UNIVERSITY OF ARKANSAS, Little Rock, AR (US)

(72) Inventor: Salahaldein Ali Ahmed Rmila, Fayetteville, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 309 days.

(21) Appl. No.: 18/107,405

(22) Filed: Feb. 8, 2023

(65) Prior Publication Data

US 2023/0344358 A1 Oct. 26, 2023

Related U.S. Application Data

(60) Provisional application No. 63/308,184, filed on Feb. 9, 2022.

(51) Int. Cl.
*H02M 3/335* (2006.01)
*H02M 1/00* (2006.01)
(Continued)

(52) U.S. Cl.
CPC ..... *H02M 3/33569* (2013.01); *H02M 1/0009* (2021.05); *H02M 1/088* (2013.01); *H02M 1/44* (2013.01); *H02M 3/01* (2021.05)

(58) Field of Classification Search
CPC ........... H02M 3/33569; H02M 1/0009; H02M 1/088; H02M 1/44; H02M 3/01;
(Continued)

(56) References Cited

U.S. PATENT DOCUMENTS 7,279,872 B2 10/2007 Hackner et al.
8,320,145 B2 11/2012 Horii
(Continued)

FOREIGN PATENT DOCUMENTS

CN 10175532 B 9/2013
CN 106787634 A 5/2017
(Continued)

OTHER PUBLICATIONS

Ahmed Rmila—A High-Input Voltage Two-Phase Series-Capacitor DC-DC—Journal of Electrical and Computer Engineering (Year: 2020).*
(Continued)

*Primary Examiner* — Kyle J Moody
(74) *Attorney, Agent, or Firm* — Shackelford, McKinley & Norton, LLP

(57) ABSTRACT

A multiphase power converter for converting electrical energy. The multiphase power converter includes at least one transformer providing isolation in the multiphase power converter. The multiphase power converter further includes a series capacitor in a series capacitor configuration. The multiphase power converter additionally includes a plurality of switches connected within the series capacitor configuration. Furthermore, the multiphase power converter includes a controller in electrical communication with the series capacitor and the plurality of switches, where the controller is configured to control power output by causing the plurality of switches to be switched according to a plurality of switching intervals of a period.

18 Claims, 29 Drawing Sheets

(51) Int. Cl.
*H02M 1/088* (2006.01)
*H02M 1/44* (2007.01)
*H02M 3/00* (2006.01)

(58) Field of Classification Search
CPC .... H02M 1/0058; H02M 1/0064; H02M 1/32; H02M 3/1586
See application file for complete search history.

(56) References Cited

U.S. PATENT DOCUMENTS

| | | | |
|---|---|---|---|
| 8,576,587 | B2 | 11/2013 | Hsu |
| 9,013,898 | B2 | 4/2015 | Ptacek et al. |
| 9,118,239 | B2 | 8/2015 | Xu et al. |
| 9,244,472 | B2 | 1/2016 | Cao et al. |
| 9,306,458 | B2* | 4/2016 | Khayat ............. H02M 3/158 |
| 9,374,008 | B2 | 6/2016 | Jang et al. |
| 9,608,531 | B2 | 3/2017 | Lin et al. |
| 9,819,277 | B2 | 11/2017 | Karlsson et al. |
| 9,837,903 | B2 | 12/2017 | Villot et al. |
| 9,866,115 | B2 | 1/2018 | Jing et al. |
| 9,887,633 | B2 | 2/2018 | Choi |
| 9,948,189 | B2 | 4/2018 | Jing et al. |
| 10,063,131 | B2 | 8/2018 | Yang et al. |
| 10,122,260 | B2 | 11/2018 | Weis |
| 10,158,357 | B1* | 12/2018 | Vinciarelli ............. H02J 3/00 |
| 10,224,827 | B1* | 3/2019 | Zhu .................. H02M 3/33584 |
| 10,511,176 | B2* | 12/2019 | Zeng ........................ H02J 5/00 |
| 10,644,525 | B2 | 5/2020 | Hofer et al. |
| 10,686,374 | B2 | 6/2020 | Tomita et al. |
| 11,601,042 | B2* | 3/2023 | Zhang ..................... H02M 1/12 |
| 2003/0227279 | A1 | 12/2003 | Feldtkeller |
| 2006/0181246 | A1 | 8/2006 | Hackner et al. |
| 2007/0086224 | A1* | 4/2007 | Phadke ............... H02M 3/285 363/65 |
| 2010/0208502 | A1 | 8/2010 | Horii |
| 2012/0020123 | A1 | 1/2012 | Hsu |
| 2013/0026836 | A1 | 1/2013 | Dighrasker et al. |
| 2014/0268891 | A1* | 9/2014 | Sigamani ............. H02M 1/14 363/17 |
| 2015/0002115 | A1* | 1/2015 | Shenoy ............... H02M 3/1584 323/271 |
| 2015/0115921 | A1 | 4/2015 | Yang et al. |
| 2015/0311792 | A1* | 10/2015 | Amaro ................ H02M 3/1584 323/271 |
| 2015/0311793 | A1* | 10/2015 | Khayat ................ H02M 3/158 323/271 |
| 2015/0340959 | A1 | 11/2015 | Karlsson et al. |
| 2016/0329807 | A1 | 11/2016 | Daly |
| 2017/0098992 | A1 | 4/2017 | Weis |
| 2017/0288537 | A1 | 10/2017 | Jing et al. |
| 2017/0353099 | A1 | 12/2017 | Yang et al. |
| 2018/0083532 | A1 | 3/2018 | Gozzini et al. |
| 2019/0068054 | A1 | 2/2019 | Ongaro et al. |
| 2019/0157974 | A1 | 5/2019 | Tomita et al. |
| 2019/0334429 | A1 | 10/2019 | Luo et al. |
| 2019/0356230 | A1 | 11/2019 | Yeh et al. |
| 2019/0386570 | A1 | 12/2019 | Xi et al. |
| 2021/0036616 | A1 | 2/2021 | Fukushima et al. |
| 2021/0067056 | A1 | 3/2021 | Tajima |
| 2021/0126529 | A1 | 4/2021 | Hung et al. |
| 2021/0296995 | A1 | 9/2021 | Zhang et al. |

FOREIGN PATENT DOCUMENTS

| | | |
|---|---|---|
| CN | 107834847 A | 3/2018 |
| CN | 108574415 A | 9/2018 |
| CN | 109560700 A | 4/2019 |
| CN | 110868066 A | 3/2020 |
| CN | 110957910 A | 4/2020 |
| CN | 111478561 A | 7/2020 |
| CN | 112187022 A | 1/2021 |
| CN | 112448585 A | 3/2021 |
| CN | 112583257 A | 3/2021 |
| DE | 10225406 A1 | 10/2003 |
| EP | 1658676 A1 | 5/2006 |
| EP | 1658676 B1 | 1/2007 |
| JP | 200913 10 A5 | 4/2010 |
| KR | 1020210027906 A | 3/2021 |
| KR | 102301947 B1 | 9/2021 |
| TW | 201206030 A | 2/2012 |
| TW | I401866 B | 7/2013 |
| TW | I671988 B | 9/2019 |
| TW | 202007063 A | 2/2020 |
| TW | 202110051 A | 3/2021 |
| WO | WO2005022748 A1 | 3/2005 |

OTHER PUBLICATIONS

Texas Instruments. TI Datasheet: TPS54A20 8-V to 14-V Input, 10-A, up to 10-MHz SWIFT™ Step Down Converter, 2016. http://www.ti.com/lit/ds/symlink/tps54a20.pdf.
P. S. Shenoy et al., "A 5 MHZ, 12 V, 10 A, monolithically integrated two-phase series capacitor buck converter," 2016 IEEE Applied Power Electronics Conf. (APEC), Long Beach, CA, 2016, pp. 66-72.
K. Abe, K. Nishijima, K. Harada, T. Nakano, T. Nabeshima and T. Sato, "A Novel Three-Phase Buck Converter with Bootstrap Driver Circuit," 2007 IEEE Power Electronics Specialists Conf., Orlando, FL, 2007, pp. 1864-1871.
K. Matsumoto, K. Nishijima, T. Sato and T. Nabeshima, "A two-phase high step down coupled-inductor converter for next generation low voltage CPU," 8th International Conf. on Power Electronics—ECCE Asia, Jeju, 2011, pp. 2813-2818.
P. S. Shenoy, M. Amaro, D. Freeman and J. Morroni, "Comparison of a 12V, 10A, 3MHz buck converter and a series capacitor buck converter," 2015 IEEE Applied Power Electronics Conf. and Exposition (APEC), Charlotte, NC, 2015, pp. 461-468.
P. S. Shenoy, M. Amaro, J. Morroni and D. Freeman, "Comparison of a Buck Converter and a Series Capacitor Buck Converter for High-Freq. High-Conversion-Ratio Voltage Regulators," in IEEE Trans. on Power Electronics, vol. 31, No. 10, pp. 7006-7015, Oct. 2016.
M. M. Jovanovic, D. E. Crow and Lieu Fang-Yi, "A novel, low-cost implementation of "democratic" load-current sharing of paralleled converter modules," in IEEE Transactions on Power Electronics, vol. 11, No. 4, pp. 604-611, Jul. 1996.
D. J. Perreault, R. L. Selders and J. G. Kassakian, "Frequency-based current-sharing techniques for paralleled power converters," in IEEE Transactions on Power Electronics, vol. 13, No. 4, pp. 626-634, Jul. 1998.
L. Hua and S. Luo, "Design Considerations for Small Signal Modeling of DC-DC Converters Using Inductor DCR Current Sensing Under Time Constants Mismatch Conditions," 2007 IEEE Power Electronics Specialists Conf., Orlando, FL, 2007, pp. 2182-2188.
J. A. A. Qahouq and L. Huang, "Highly Efficient VRM For Wide Load Range with Dynamic Non-Uniform Current Sharing," APEC 07—Twenty-Second Annual IEEE Applied Power Electronics Conf. and Exposition, Anaheim, CA, USA, 2007, pp. 543-549.
P. S. Shenoy et al., "Automatic current sharing mechanism in the series capacitor buck converter," 2015 IEEE Energy Conversion Congress and Exposition (ECCE), Montreal, QC, 2015, pp. 2003-2009.
S. K. Mazumder, M. Tahir and K. Acharya, "Master-Slave Current-Sharing Control of a Parallel DC-DC Converter System Over an RF Communication Interface," in IEEE Transactions on Industrial Electronics, vol. 55, No. 1, pp. 59-66, Jan. 2008.
Z. Lukic, Z. Zhao, A. Prodic and D. Goder, "Digital Controller for Multi-Phase DC-DC Converters with Logarithmic Current Sharing," 2007 IEEE Power Electronics Specialists Conf., Orlando, FL, 2007, pp. 119-123.
Xunwei Zhou, Peng Xu and F. C. Lee, "A novel current-sharing control technique for low-voltage high-current voltage regulator module applications," in IEEE Transactions on Power Electronics, vol. 15, No. 6, pp. 1153-1162, Nov. 2000.
G. Zhou, J. Xu and J. Wang, "Constant-Frequency Peak-Ripple-Based Control of Buck Converter in CCM: Review, Unification, and

(56) References Cited

OTHER PUBLICATIONS

Duality," in IEEE Transactions on Industrial Electronics, vol. 61, No. 3, pp. 1280-1291, Mar. 2014.
Rmila et al., A high-Input Voltage Two-Phase Series-Capacitor DC-DC Converter, 2020, Hindawi Journal of Electrical and Computer Enginering.

* cited by examiner

ISOLATED MULTIPHASE SERIES CAPACITOR CONVERTERS

TECHNICAL FIELD

The present invention relates generally to power converters, and more particularly to isolated multiphase series capacitor converters.

BACKGROUND

A power converter is an electrical or electro-mechanical device for converting electrical energy. A power converter can convert alternating current (AC) into direct current (DC) and vice-versa; change the voltage or frequency of the current or do some combination of these. The power converter can be as simple as a transformer or it can be a far more complex system, such as a resonant converter.

Power converters are classified based on the type of power conversion they do. One way of classifying power conversion systems is according to whether the input and output are alternating current or direct current. Finally, the task of all power converters is to process and control the flow of electrical energy by supplying voltages and currents in a form that is optimally suited for user loads.

Such power converters may be "isolated" power converters. An "isolated" power converter isolates the input from the output by electrically and physically separating the circuit into two sections preventing direct current flow between input and output, typically achieved by using a transformer.

Furthermore, such power converters may be "multiphase" converters. Multiphase converters reduce the input and output current ripples by interleaving the two or more stages of power converters. By increasing the phase number, the output-voltage ripple and the input capacitor size can be curtailed without increasing the switching frequency of the power devices.

Isolated multiphase converters offer excellent performance advantages in transient response and efficiency. These advantages can only be fully achieved with the appropriate current sharing between all the phases of the design in order to effectively distribute the heat, especially at high current demand. In such power converters, series current shunt resistors are utilized to measure the current.

Unfortunately, the shunt resistor will cause extra power loss to the converter and reduce the converter efficiency. In addition, the shunt resistor, which may be connected in series in the power loop, will also bring additional challenges to the isolation design of the converter.

Consequently, current designs of isolated multiphase converters are not able to achieve the appropriate current sharing between all the phases of the design without the utilization of shunt resistors.

SUMMARY

In one embodiment of the present disclosure, a multiphase power converter comprises at least one transformer providing isolation in the multiphase power converter. The multiphase power converter further comprises a series capacitor in a series capacitor configuration. The multiphase power converter additionally comprises a plurality of switches connected within the series capacitor configuration. Furthermore, the multiphase power converter comprises a controller in electrical communication with the series capacitor and the plurality of switches, where the controller is configured to control power output by causing the plurality of switches to be switched according to a plurality of switching intervals of a period.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present invention can be obtained when the following detailed description is considered in conjunction with the following drawings, in which.

DETAILED DESCRIPTION

Figure 1:
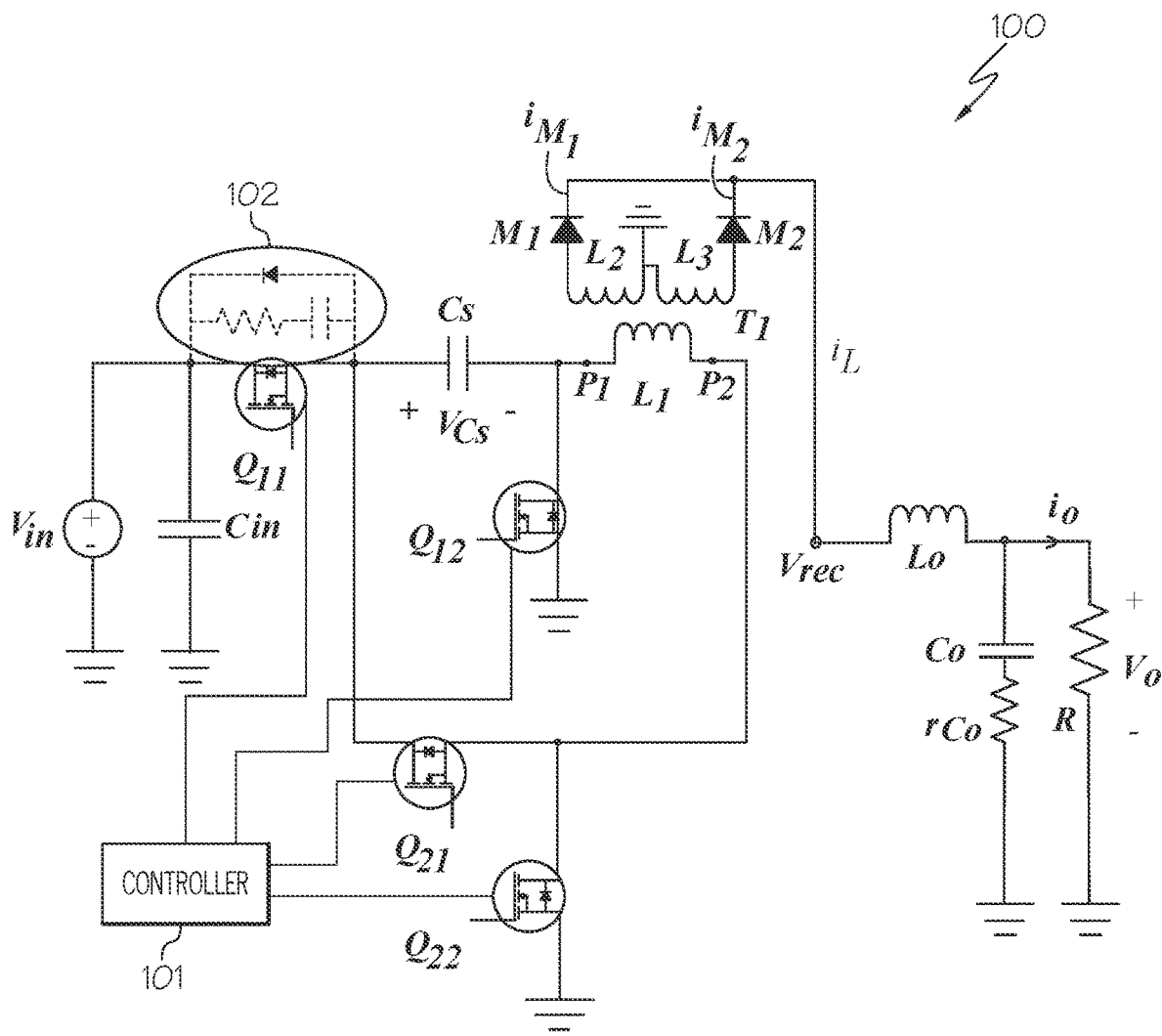
FIG. 1 illustrates an example topology of an isolated two-phase series capacitor Buck converter (I-2pscB) in accordance with an embodiment of the present disclosure.

As stated in the Background section, a power converter is an electrical or electro-mechanical device for converting electrical energy. A power converter can convert alternating current (AC) into direct current (DC) and vice-versa; change the voltage or frequency of the current or do some combination of these. The power converter can be as simple as a transformer or it can be a far more complex system, such as resonant converter.

Power converters are classified based on the type of power conversion they do. One way of classifying power conversion systems is according to whether the input and output are alternating current or direct current. Finally, the task of all power converters is to process and control the flow of electrical energy by supplying voltages and currents in a form that is optimally suited for user loads.

Such power converters may be "isolated" power converters. An "isolated" power converter isolates the input from the output by electrically and physically separating the circuit into two sections preventing direct current flow between input and output, typically achieved by using a transformer.

Furthermore, such power converters may be "multiphase" converters. Multiphase converters reduce the input and output current ripples by interleaving the two or more stages of power converters. By increasing the phase number, the output-voltage ripple and the input capacitor size can be curtailed without increasing the switching frequency of the power devices.

Isolated multiphase converters offer excellent performance advantages in transient response and efficiency. These advantages can only be fully achieved with the appropriate current sharing between all the phases of the design in order to effectively distribute the heat, especially at high current demand. In such power converters, series current shunt resistors are utilized to measure the current.

Unfortunately, the shunt resistor will cause extra power loss to the converter and reduce the converter efficiency. In addition, the shunt resistor, which may be connected in series in the power loop, will also bring additional challenges to the isolation design of the converter.

Consequently, current designs of isolated multiphase converters are not able to achieve the appropriate current sharing between all the phases of the design without the utilization of shunt resistors.

Embodiments of the present disclosure enable isolated multiphase converters to achieve the appropriate current sharing between all the phases of the design without the utilization of shunt resistors by utilizing the current sharing mechanism maintained by the two-phase series capacitor converter series capacitor voltage. In one embodiment, the principles of the present disclosure disclose a topology for an isolated two-phase series capacitor converter which is used for point to load applications. Using the equivalent circuit of a transformer, the isolating feature allows the two-phase series capacitor converter to operate at higher voltage conversion rates. For some designed circuits, the power efficiency reaches up to 97%. The output voltage is controlled by changing the duty cycles of switches (e.g., $Q_{11}$ and $Q_{21}$). Both Class D transformer center-tapped rectifier and coupled inductors can be used at the converter output stage, which are bidirectional core excitation when both positive and negative parts of the B-H curve are used, similar to the Full-bridge transformer; however, the rectifier is uncontrolled. These and other features are discussed in greater detailed below.

Due to an increase in demand for broad applicability domains that include computers, telecommunication systems, appliances, industrial electronic equipment, electrical vehicles (EV), uninterruptible power supplies (UPS), and much more, the present disclosure is directed at finding highly efficient converter topologies for various power conversion rates. Multiphase topologies have increasingly become the best choice for accomplishing the conversion demand objectives and are quickly gaining interest due to the many benefits they provide, such as enabling higher power density and efficiency.

Isolated multiphase converters can offer excellent performance advantages in terms of transient response and efficiency. In various embodiments, these advantages can be achieved if the load "current" sharing between all the phases of the design is confirmed. However, in order to confirm such current sharing, multiple control loops are utilized which adds more complexity and complications to the circuit. The present disclosure sheds light on a new isolated multiphase topology that can address these design issues and provide a more effective solution for the design of isolated multiphase converters.

For conventional topologies of switched-mode power supplies (SMPS), the order from lower output power to higher output power is usually flyback, forward, push-pull, half-bridge and full-bridge. Because this fundamental power order remains unchanged, it is thought that a great deal of focus is required to reach new heights in power density. Topologies that were previously used in much higher power applications are now making their way into lower power, smaller form factor high-density power converters. In various embodiments, power management integrated circuit (IC) designers can enable this trend by adding not only more features but also by integrating high-voltage gate drivers within the controllers.

Generally, the output power range is the main guideline when choosing a topology. However, for isolated DC-DC power converters, topology selection also involves many other factors, such as complexity, control simplicity, cost, size, electrical stress, output noise and input voltage range. The size of an isolated power converter mainly depends on the size of the transformer and the number of active switches used. The utilization rate of the power transformer affects the size of the power converter. When these power supplies operate at higher input voltages and load currents, they pass strong magnetic fields into the core of the isolating transformer. When the input alternating current (AC) signal oscillates, the magnetic core used in the transformer will produce hysteresis. There is a risk that the transformer core will saturate during steady-state operation when the input current is very high, which leads to more severe hysteresis and heat dissipation in the core. Direct current (DC)-DC converter transformers and core material manufacturers usually provide hysteresis curves on their components, which allow designers to determine the maximum input current allowed.

Typically, converter units with lower efficiency will heat up to higher temperatures when operating at high temperatures. Different core materials will saturate at different magnetic field strengths, which determines the highest voltage that can be used with the transformer. To minimize heat generation and power loss, selecting a transformer that works within the linear hysteresis range of the power supply can be a key factor. Also, the current sharing mechanism can play an important role in reducing the current mismatch between multiphases. This current stability can regulate transformer operation and minimize heat generation.

In traditional intelligent power modules, series-current shunt resistors are usually inserted to measure the current. However, the shunt resistor will cause extra power loss to the module and reduce its efficiency. In addition, the shunt resistor connected in series in the power loop will also bring additional challenges to the isolation design of the module. In the various embodiments described herein, there is no need for phase shunt sensors since the balance can be easily reached by the concept of the current-sharing mechanism described herein.

The present disclosure describes examples of a topology for an isolated two-phase series capacitor Buck converter (sometimes referred to herein as the "Isolated 2-pscB" or the "I-2pscB converter") that is used for point-of-load (PoL) applications. Using the equivalent circuit of a transformer, the isolating feature allows a 2-pscB to operate at higher voltage conversion rates. For example, for some designed circuits, the power efficiency can reach 97%. The output voltage can be controlled by changing the duty cycles ($D_1$ and $D_3$) of switches $Q_{11}$ and $Q_{21}$. Both Class-D transformer center-tapped rectifiers and coupled inductors can be used at the converter output stage, which is bidirectional core excitation when both positive and negative parts of the B-H curve are used, similar to the full-bridge transformer; however, the rectifier is uncontrolled.

In various embodiments, isolated multiphase converters such as those described herein can achieve various advantages. As an example, isolated multiphase converters can offer excellent performance advantages in transient response, efficiency, power density and protection. In another example, automatic current balancing between phases can be easily achieved when the two transformers' paths and coupling inductors have the same size and storage energy, and the two-phase printer circuit board (PCB) layouts are the same. In another example, in various embodiments, there is no need to have any phase current sensing elements and complicated control comparators to achieve the current sharing, which can be a critical issue for distributing the heat, especially at high load demand. In another example, adding transformers or coupled inductors is more efficient due to the inherited self-current sharing mechanism. In another example, the inductors, transformer coils and coupled inductors act as current sources to softly charge and discharge the series capacitor in four-mode power stages (i.e., self-charging). In various embodiments, the principles described in the present disclosure are applicable to multiple fields, such as, for example, computers, telecommunication systems, appliances, industrial electronic equipment, electric vehicles and uninterruptible power supplies.

FIG. 1 illustrates an example topology of an isolated two-phase series capacitor Buck converter (I-2pscB) 100 in accordance with an embodiment of the present disclosure. As shown in FIG. 1, converter 100 includes capacitors ($C_{in}$, $C_s$, $C_{out}$), resistors (R, $r_{co}$), inductors ($L_1$, $L_2$, $L_3$, $L_0$), diodes ($M_1$, $M_2$), voltage source ($V_{in}$) and transformer ($T_1$) connected in the manner as shown in FIG. 1. In one embodiment, transformer ($T_1$), and other transformers discussed herein, are configured to provide isolation in multiphase power converters.

Furthermore, as illustrated in FIG. 1, converter 100 further includes a controller 101 electrically connected to the series capacitor ($C_s$) and switches ($Q_{11}$, $Q_{12}$, $Q_{21}$ and $Q_{22}$). In one embodiment, controller 101 is configured to control the power output ($V_0$) by causing switches ($Q_{11}$, $Q_{12}$, $Q_{21}$ and $Q_{22}$) to be switched according to switching intervals of a period as discussed further below. In one embodiment, controller 101 adjusts the voltage applied to the base terminal of the switches to switch the switches on or off. While the following circuits do not include controller 101, such a controller is assumed to be present for controlling the switching of the switches according to switching intervals of a period.

In some embodiments, freewheeling diodes (diode that is connected across an inductor to eliminate the flyback) and snubber capacitors (capacitor that is connected to a large-current switching node for the purpose of reducing the parasitic inductance of electric wiring) can be added to provide a path for the current due to the transformer leakage inductance and magnetizing inductance ($L_m$) when the switches ($Q_{11}$, $Q_{12}$, $Q_{21}$ and $Q_{22}$) are turned off. The freewheeling intervals $D_2T$ and $(1-D_3)T$ (duty cycle pulses $D_2$ and $D_3$ are discussed further below in connection with FIG. 3) are determined by the energy stored in the transformer leakage inductance and series capacitor charging time. During these intervals, the voltage applied across this inductance is—$V_{IN}/2$.

In one embodiment, resistor-capacitor-diode (RCD) snubbers 102 are incorporated to reduce voltage spikes and ringing in step-down DC-DC converters.

In one embodiment, an input power of multiphase power converter 100 is connected to a regulated direct current (DC) power source. In one embodiment, an input power of multiphase power converter 100 is connected to an alternating current (AC) distribution grid, such as through an electromagnetic interference filter.

FIGS. 2A-2D illustrate an example of switching intervals in the isolated topology of the isolated two-phase series Buck converter of FIG. 1 in accordance with an embodiment of the present disclosure.

Figure 2A:
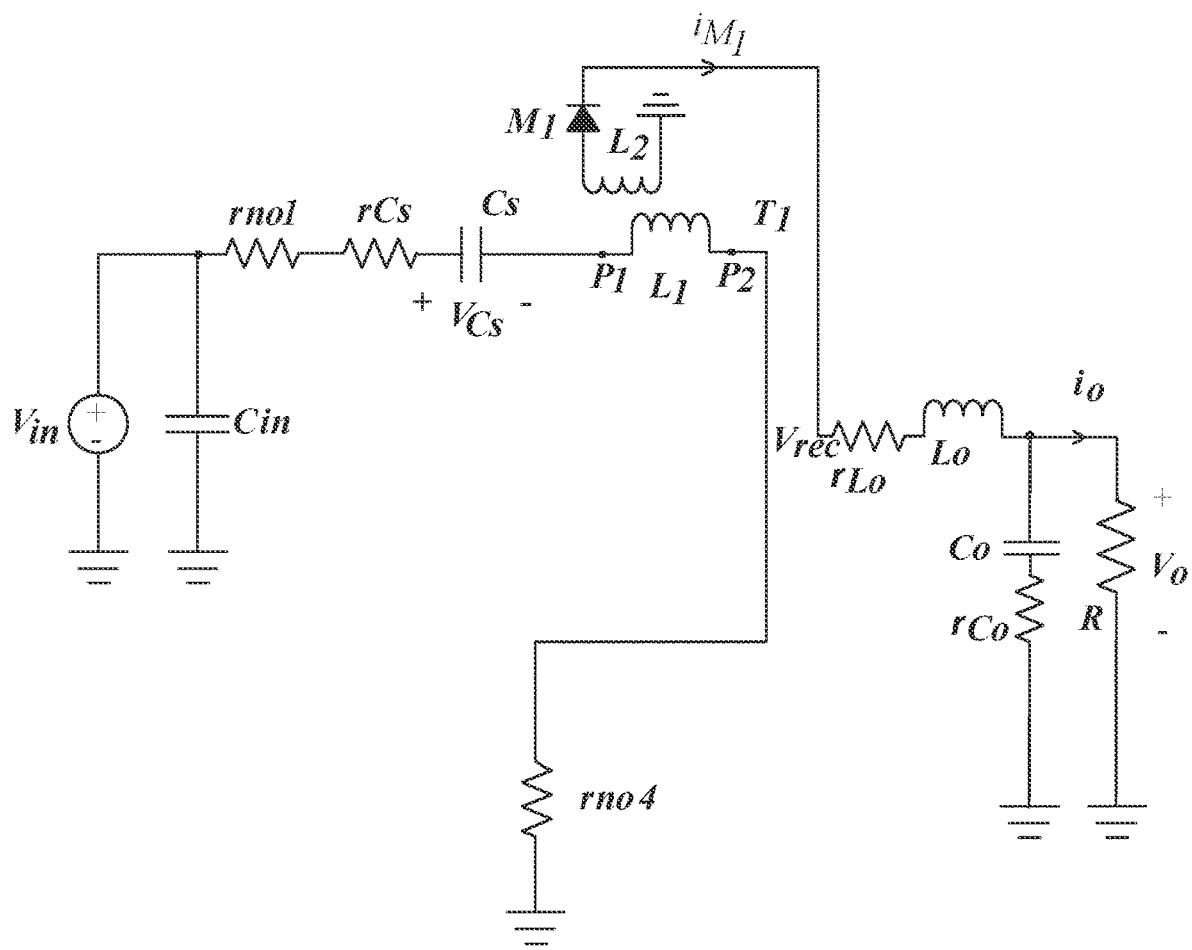
FIGS. 2A-2D illustrate an example of switching intervals in the isolated topology of the isolated two-phase series Buck converter of FIG. 1 in accordance with an embodiment of the present disclosure.
Figure 2B:
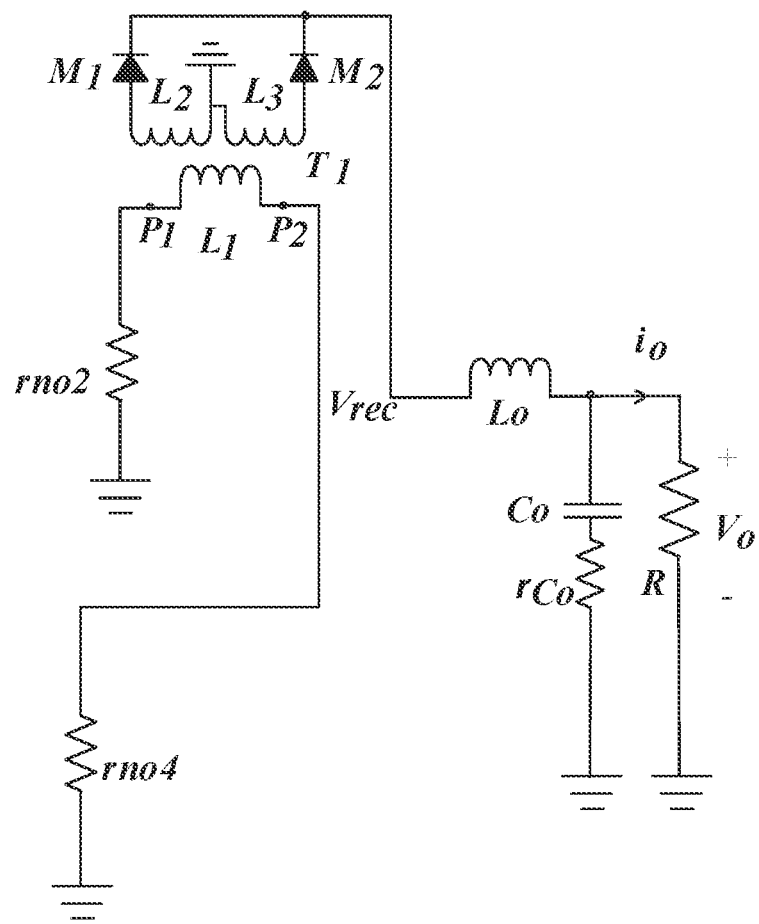
Figure 2C:
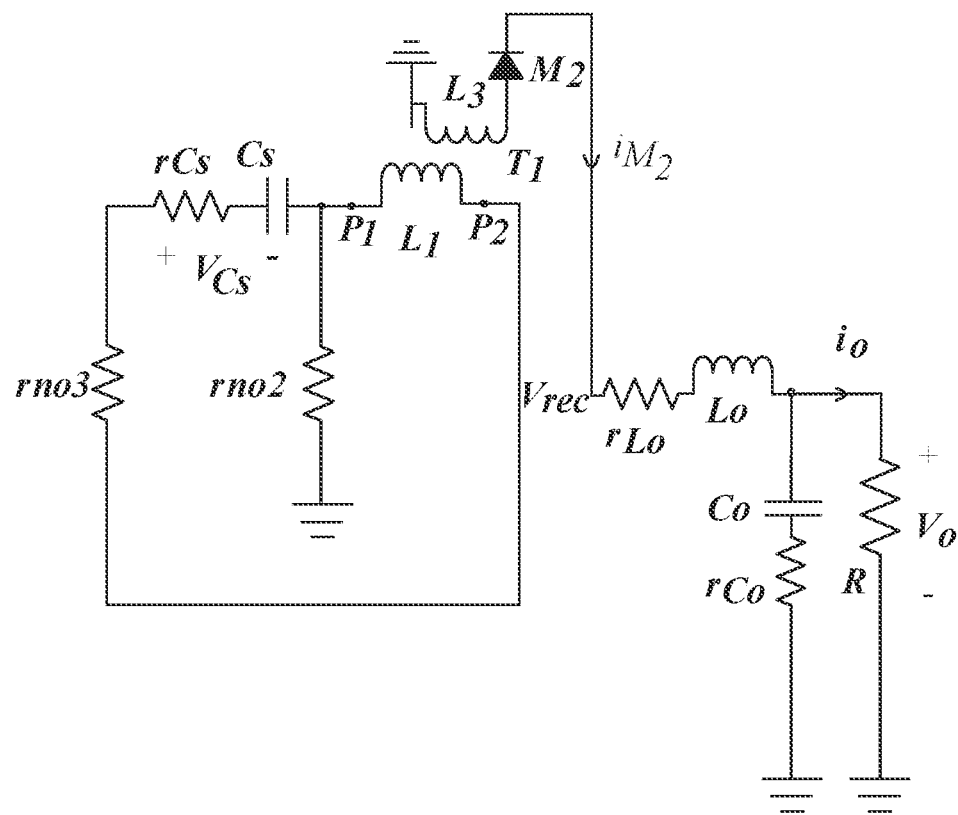
Figure 2D:
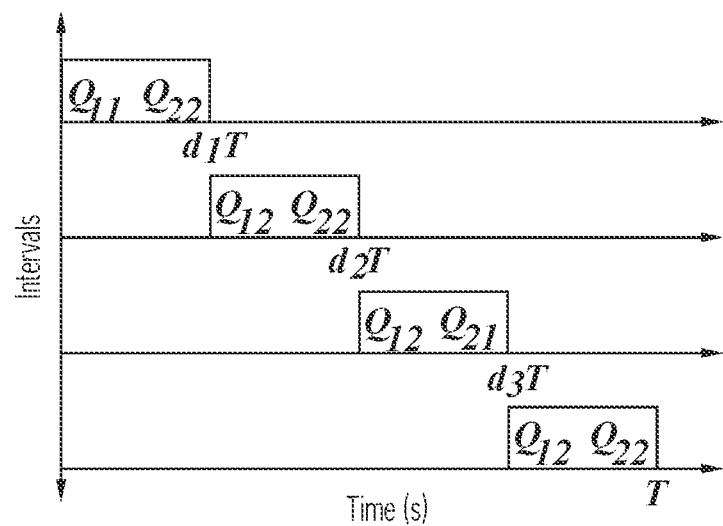

In particular, FIG. 2A illustrates the first switching interval $D_1T$ with $Q_{11}$ and $Q_{22}$ switching on. FIG. 2B illustrates the second and fourth switching intervals $D_2T$ and $(1-D_1-D_2-D_3)T$ with $Q_{12}$ and $Q_{22}$ switching on. FIG. 2C illustrates the third switching interval $D_3T$ with $Q_{12}$ and $Q_{21}$ switching on. FIG. 2D illustrates the converter switching time intervals.

Furthermore, the rectified output voltage ($V_{rec}$ as shown in FIG. 1) will be:

$$V_{rec} = \frac{1}{2} \frac{N_s}{N_p} V_{in} \qquad \text{Equation (1)}$$

where Ns represents the number of windings in the secondary coil and Np represents the number of windings in the primary coil of transformer $T_1$ of FIG. 1.

Figure 3:
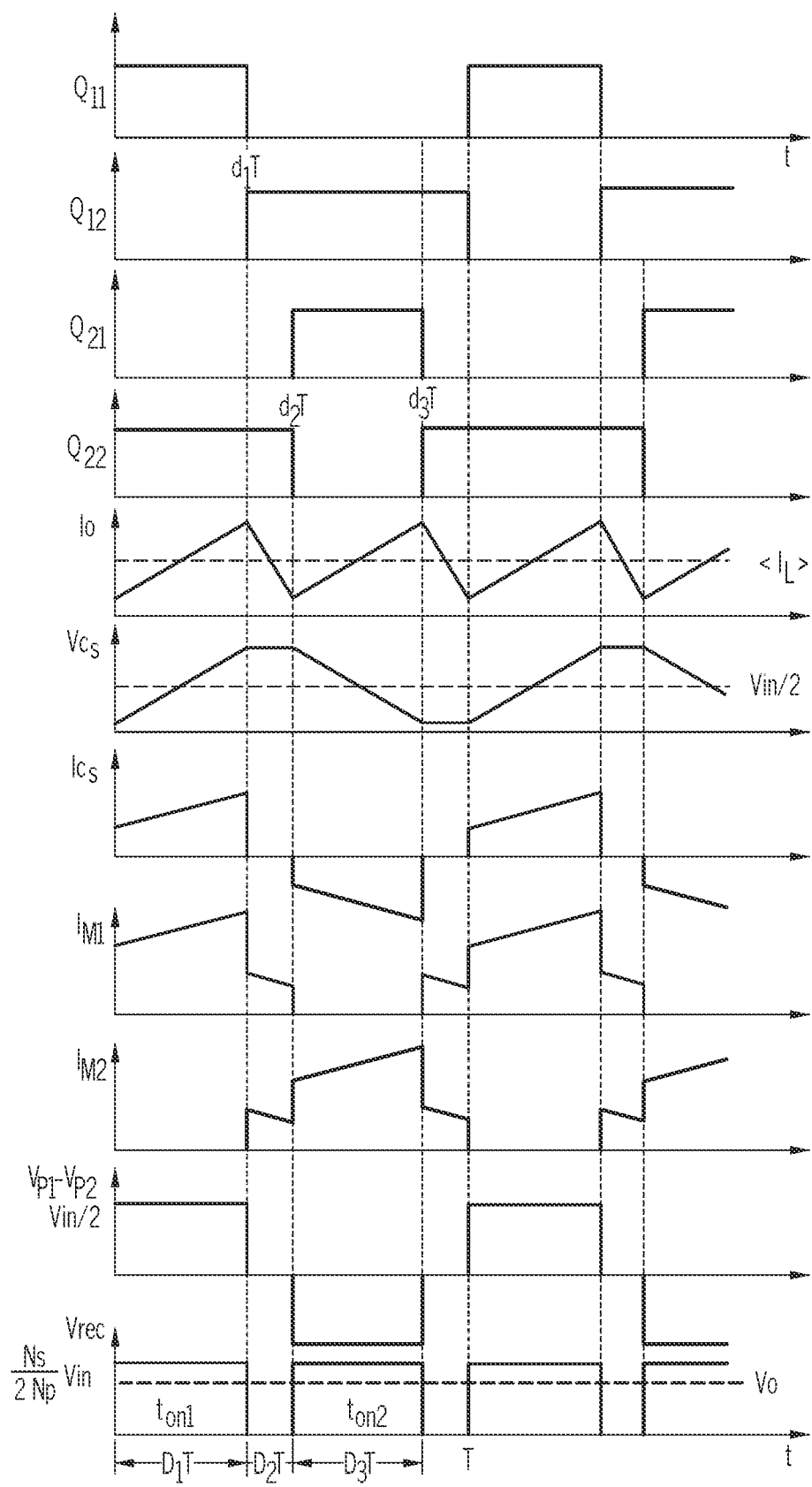
FIG. 3 illustrates an example of the topology waveforms of the isolated two-phase series capacitor Buck converter in accordance with an embodiment of the present disclosure.

FIG. 3 illustrates an example of the topology waveforms of the isolated two-phase series capacitor Buck converter in accordance with an embodiment of the present disclosure. The latter is not a rectified replica of the voltage between $P_1$ and $P_2$ (see FIG. 1), so there is a duty cycle loss. To calculate the relation between the source and load voltages, the voltage across the filter needs to be analyzed, where the voltage across the filter inductor $L_O$ is given by:

$$V_{Lo} = \frac{1}{2} \frac{N_s}{N_p} V_{in} - V_o \text{ for } 0 < t < (t_{on1} = D_1T) \qquad \text{Equation (2)}$$

During this interval, $i_L$ flowing through diode $M_1$ increases linearly, and equals $i_{M1}$ as shown in FIG. 3. At complete current sharing between phase A and phase B, the duty cycle $D_1=D_3$ can vary between [0-T/2] for phase A, where $[T/2-D_1T=D_2T]$ is the dead time required to avoid shorting the input source. During this dead time—when switches $Q_{11}$ and $Q_{21}$ are off—the inductor current is equally split between the two secondary half windings. Assuming ideal diodes $V_{rec}=0$, and the filter inductor voltage is given by:

$$V_{Lo} = -V_o \qquad \text{Equation (3)}$$

For the dead time interval $t_{on1} < t < t_{on2} + D_2T$. Hence $$i_{M1} = i_{M2} = \frac{1}{2} i_L \qquad \text{Equation (4)}$$

The next half cycle of $t_{on2}$ (see FIG. 3), phase B starts at $(t_{on1}+D_2T)$ during which $Q_{21}$ and $Q_{21}$ are turned on. Therefore, $$t_{on1} + D_2T = \frac{1}{2}T \qquad \text{Equation (5)}$$

$$t_{on1} = t_{on2} \qquad \text{Equation (6)}$$

Equating the time integral of the inductor voltage over one period to zero and solving equations (2) to (5) yield the following, where n is the turn ratio Ns/Np:

$$V_o = \frac{N_s}{N_p} DV_{in} = nDV_{in} \qquad \text{Equation (7)}$$

Like full-bridge topologies, switches of this topology typically operate under hard-switching conditions at turn-off when turn-off snubbers are not used. As the switching frequency increases, hard switching transitions occur more often; therefore, the average switching power losses in the devices increase. However, high switching frequencies are desirable in these topologies due to the reduction in size of the filter components and transformers, which reduces the size and weight of the converter in general. The freewheeling intervals in FIG. 3 $D_2T$, $(1-D_1-D_2-D_3)T$, are controlled by the energy stored in the transformer leakage inductance. The highest possible switching frequency is limited by the primary current setting.

Figure 4:
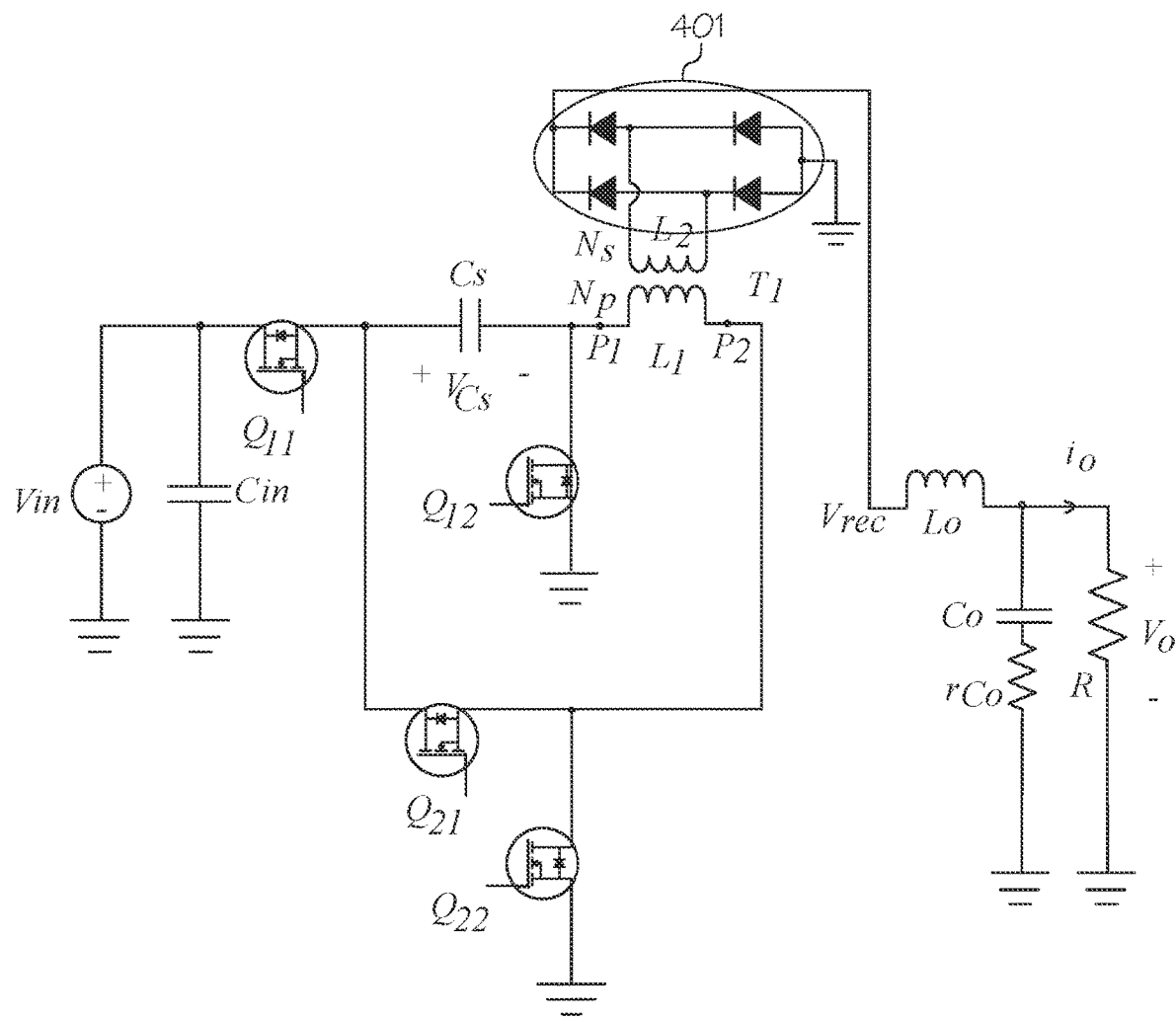
FIG. 4 illustrates the utilization of a single-phase tap changing transformer with a full-wave bridge in accordance with an embodiment of the present disclosure.

FIG. 4 illustrates the utilization of a single-phase tap changing transformer ($T_1$) with a full-wave bridge 401 ("Bridge rectifier") in accordance with an embodiment of the present disclosure. As illustrated in FIG. 4, Bridge rectifier 401 uses four diodes that are arranged to convert the AC supply voltage to a DC supply voltage. A Bridge rectifier has certain advantages over a center-tap rectifier. It possesses a better transformer utilization factor, better voltage regulation, etc., but it also has the drawback of having a greater voltage drop as compared to a center tap because it has four diodes.

Figure 5:
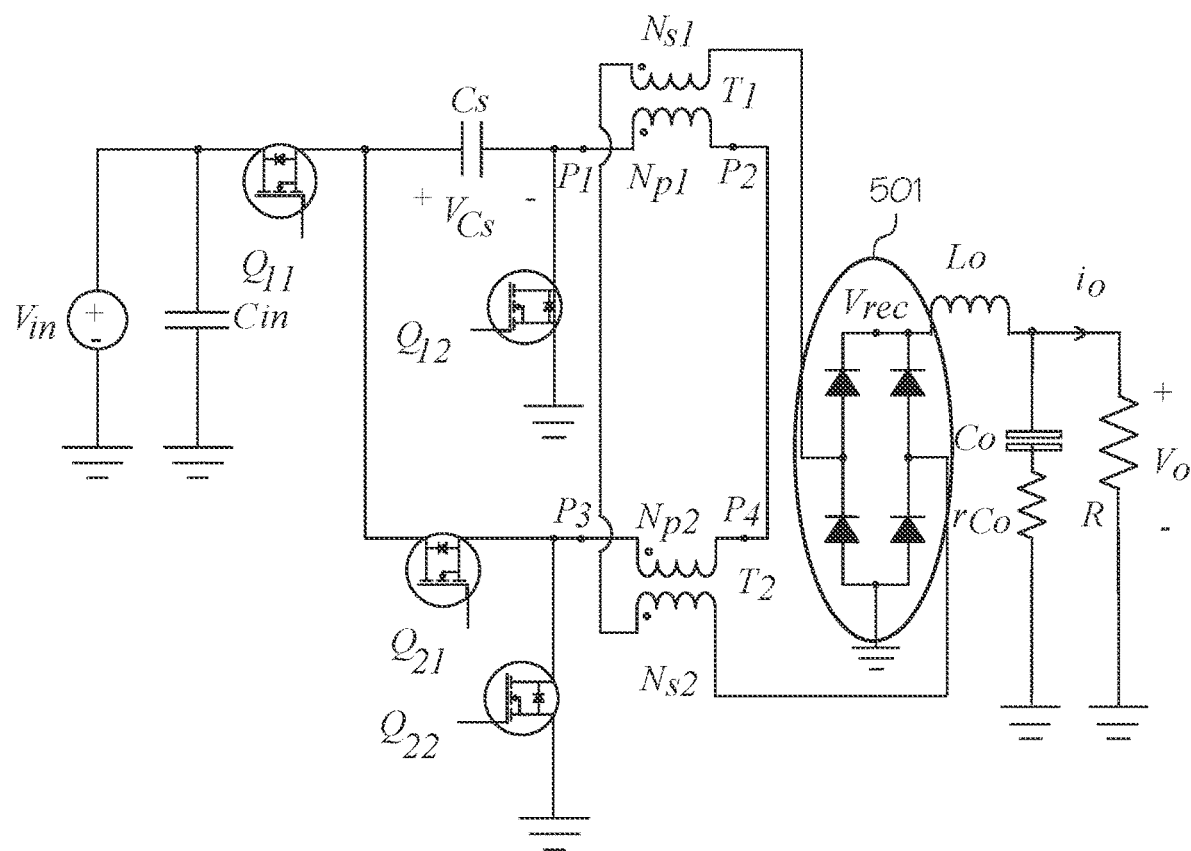
FIG. 5 illustrates the utilization of two single-phase tap changing transformers with a full-wave bridge in accordance with an embodiment of the present disclosure.

FIG. 5 illustrates the utilization of two single-phase tap changing transformers ($T_1$ and $T_2$) with a full-wave bridge 501 in accordance with an embodiment of the present disclosure. In one embodiment, transformer $T_1$ is used for the first phase of the multiphase power converter and transformer $T_2$ is used for the second phase of the multiphase power converter. As shown in FIG. 5, adding another single-phase tap changing transformer ($T_2$) to the circuit of FIG. 4 increases efficiency. In particular, in various embodiments, this is done by adding another transformer to a full bridge rectifier.

Figure 6:
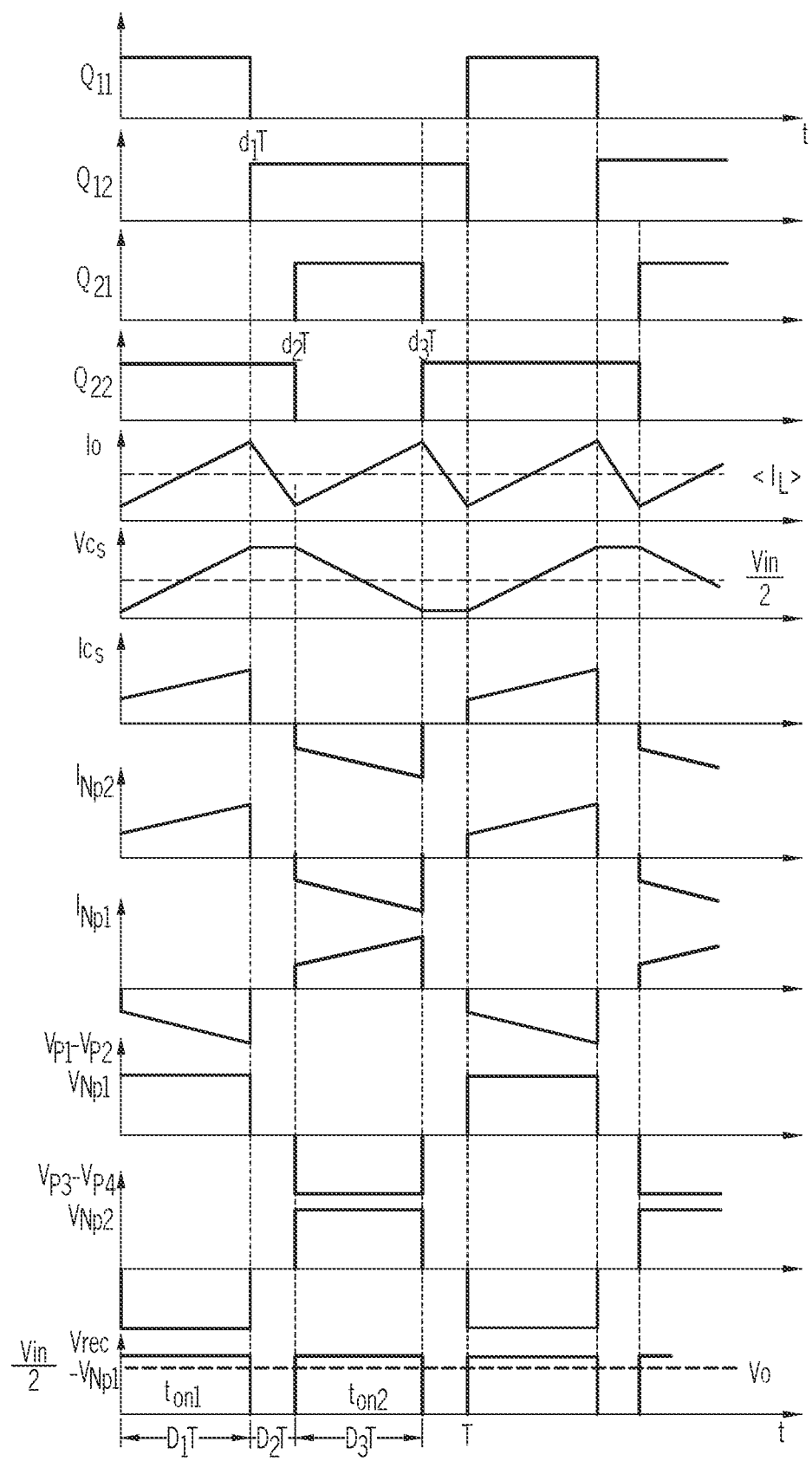
FIG. 6 illustrates an example of the topology waveforms of the two single-phase tap changing transformers of FIG. 5 with a full-wave bridge in accordance with an embodiment of the present disclosure.

FIG. 6 illustrates an example of the topology waveforms of the two single-phase tap changing transformers of FIG. 5 with a full-wave bridge in accordance with an embodiment of the present disclosure.

Figure 7:
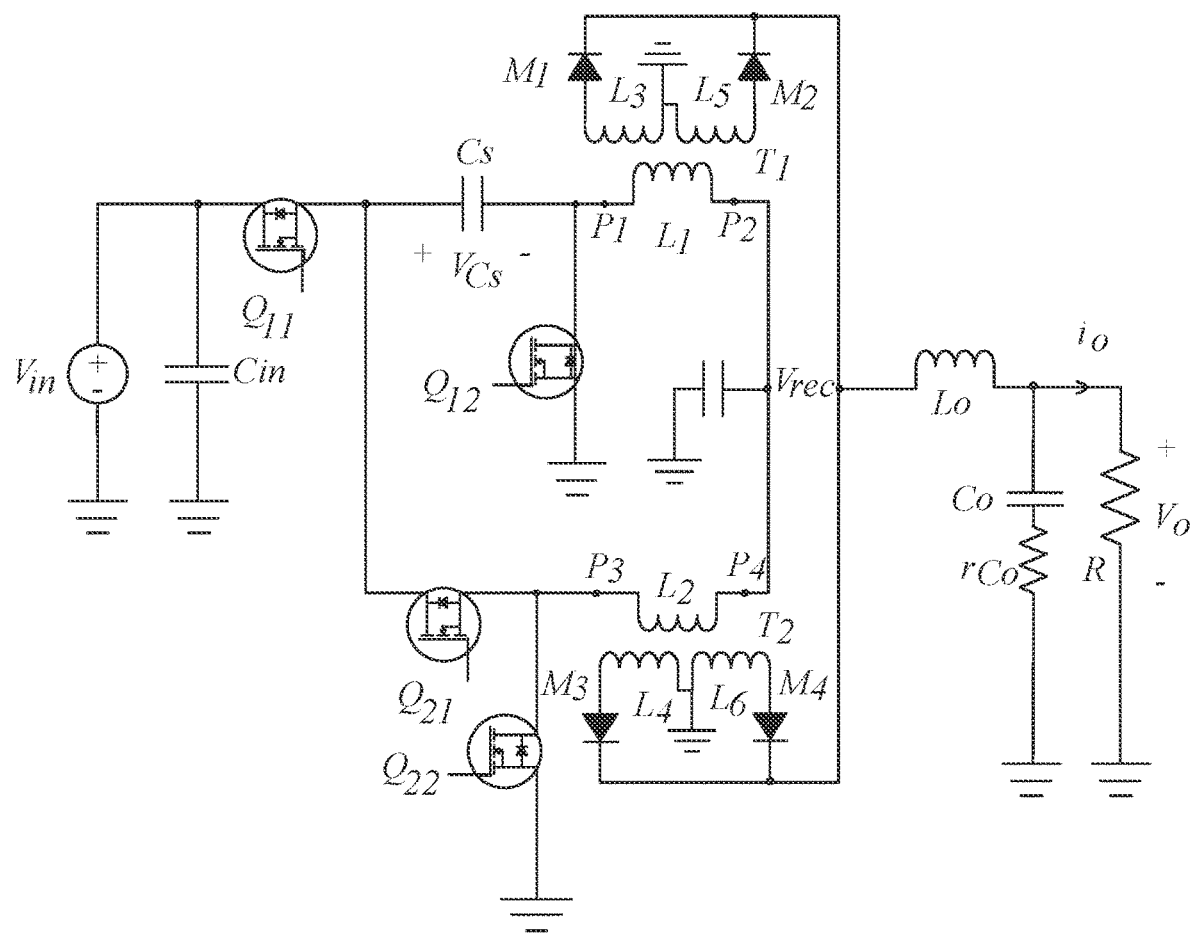
FIG. 7 illustrates adding a transformer to the circuit of FIG. 1 in accordance with an embodiment of the present disclosure.

FIG. 7 illustrates adding a transformer ($T_2$) to the circuit of FIG. 1 in accordance with an embodiment of the present disclosure in order to increase efficiency. In particular, in various embodiments, by adding another transformer (see $L_2$, $L_4$, $L_6$, $M_3$, $M_4$), it is possible to increase efficiency where every phase has a separate transformer, as seen in FIG. 7 of a (type-I) isolated 2-pscB converter with two center-tapped rectifier transformers.

Figure 8A:
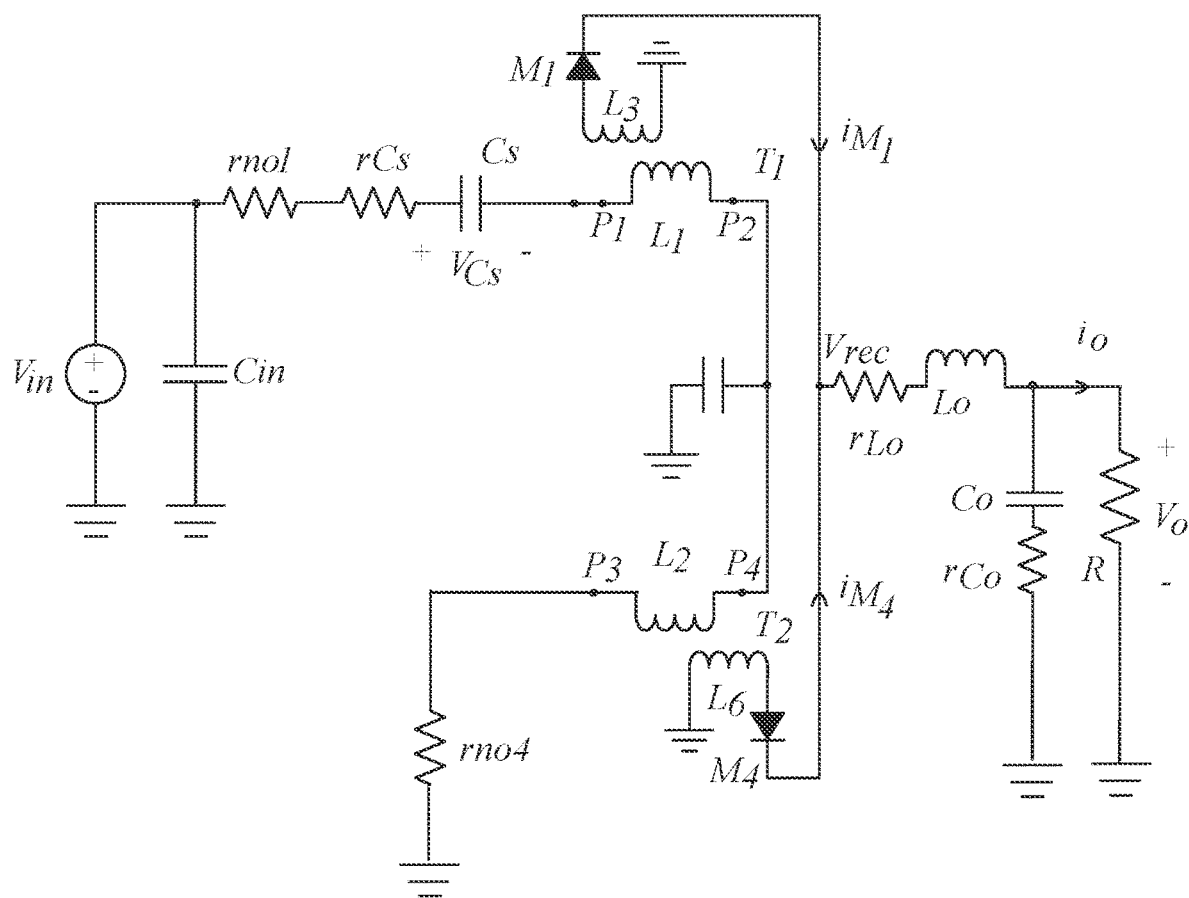
FIGS. 8A-8D illustrate an example of switching intervals of the circuit of FIG. 7 in accordance with an embodiment of the present disclosure.
Figure 8B:
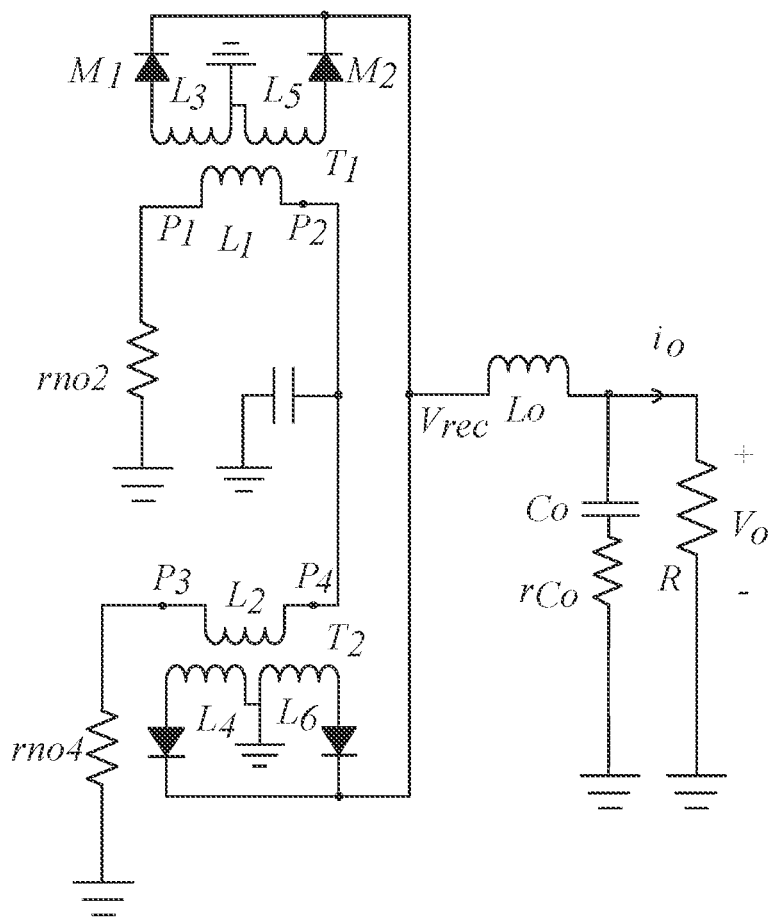
Figure 8C:
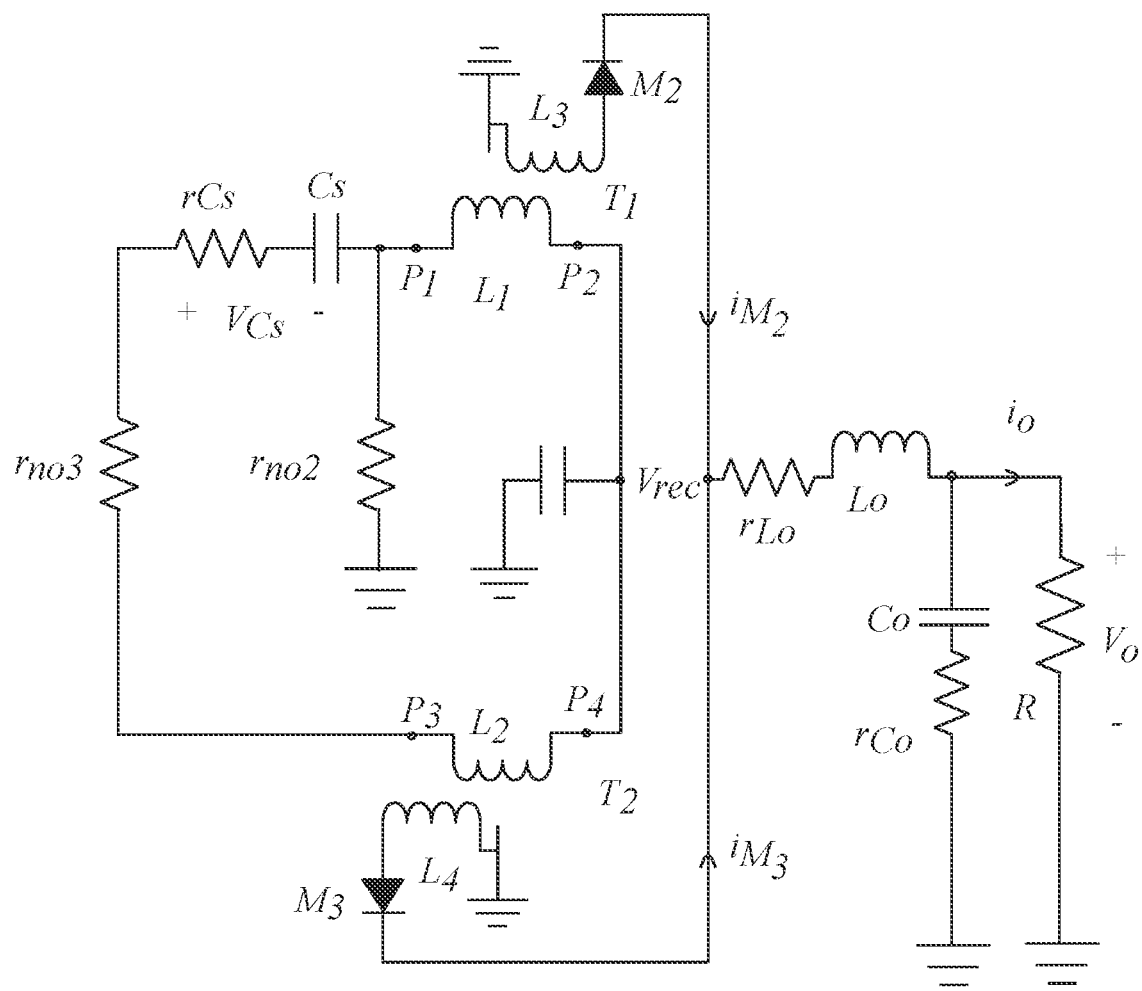
Figure 8D:
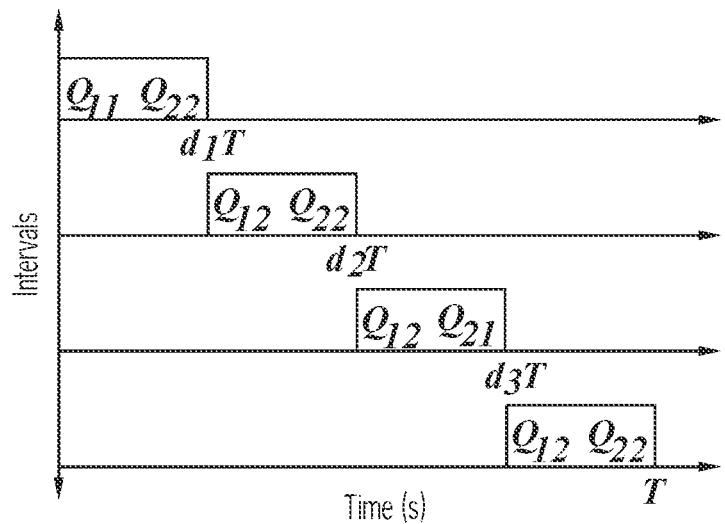

FIGS. 8A-8D illustrate an example of switching intervals of the circuit of FIG. 7 in accordance with an embodiment of the present disclosure. In particular, FIG. 8A illustrates the first switching interval $D_1T$ with $Q_{11}$ and $Q_{22}$ switching on. FIG. 8B illustrates the second and fourth switching intervals $D_2T$ and $(1-D_1-D_2-D_3)T$ with $Q_{12}$ and $Q_{22}$ switching on. FIG. 8C illustrates the third switching interval $D_3T$ with $Q_{12}$ and $Q_{21}$ switching on. FIG. 8D illustrates the converter switching time intervals. Different types of isolated 2-pscB converters can be selected in terms of efficient performance.

Figure 9:
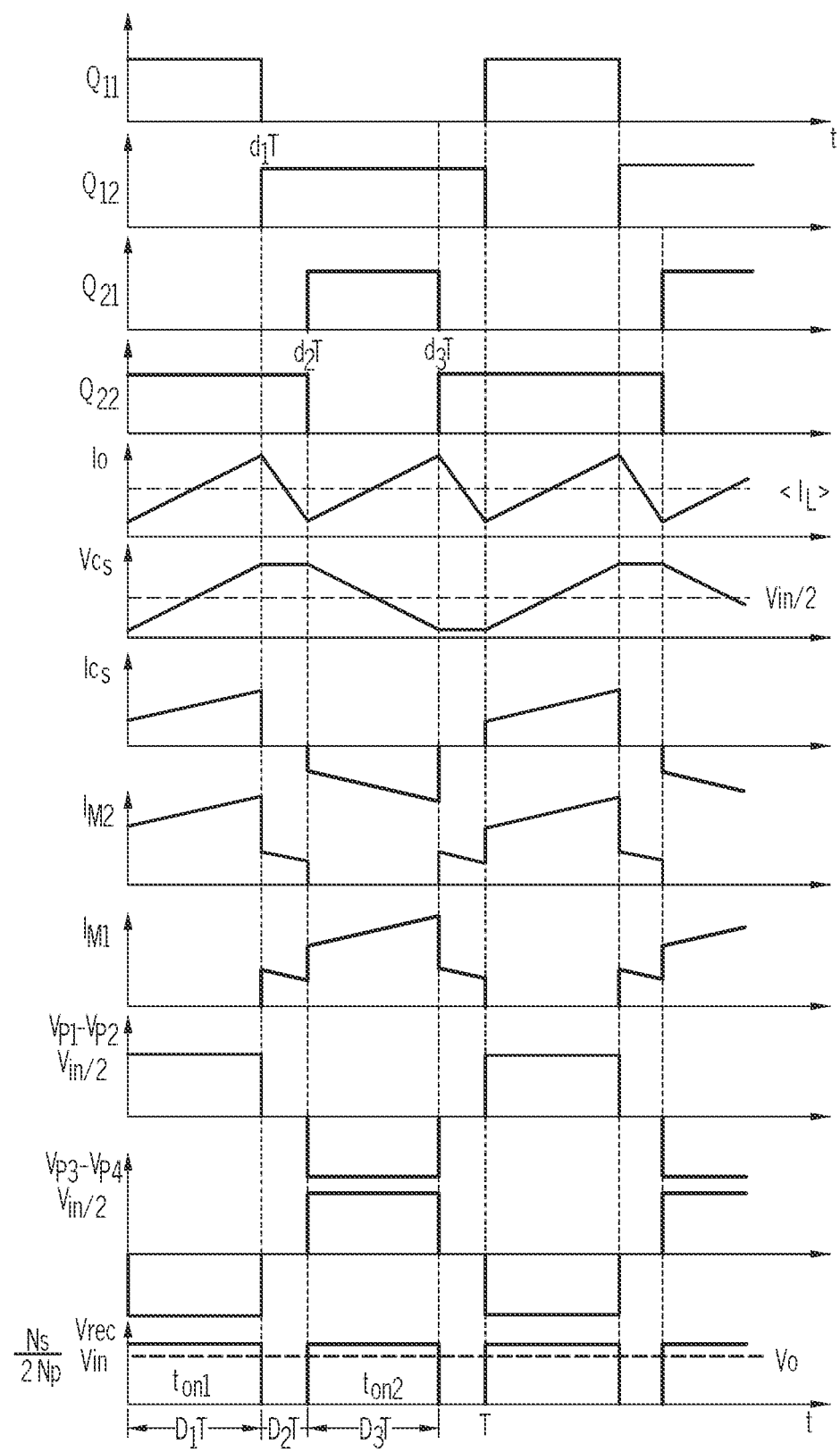
FIG. 9 illustrates an example of type-I isolated 2-pscB converter waveforms using two center-tapped ideal transformers in accordance with an embodiment of the present disclosure.

FIG. 9 illustrates an example of type-I isolated 2-pscB converter waveforms using two center-tapped ideal transformers in accordance with an embodiment of the present disclosure.

Figure 10:
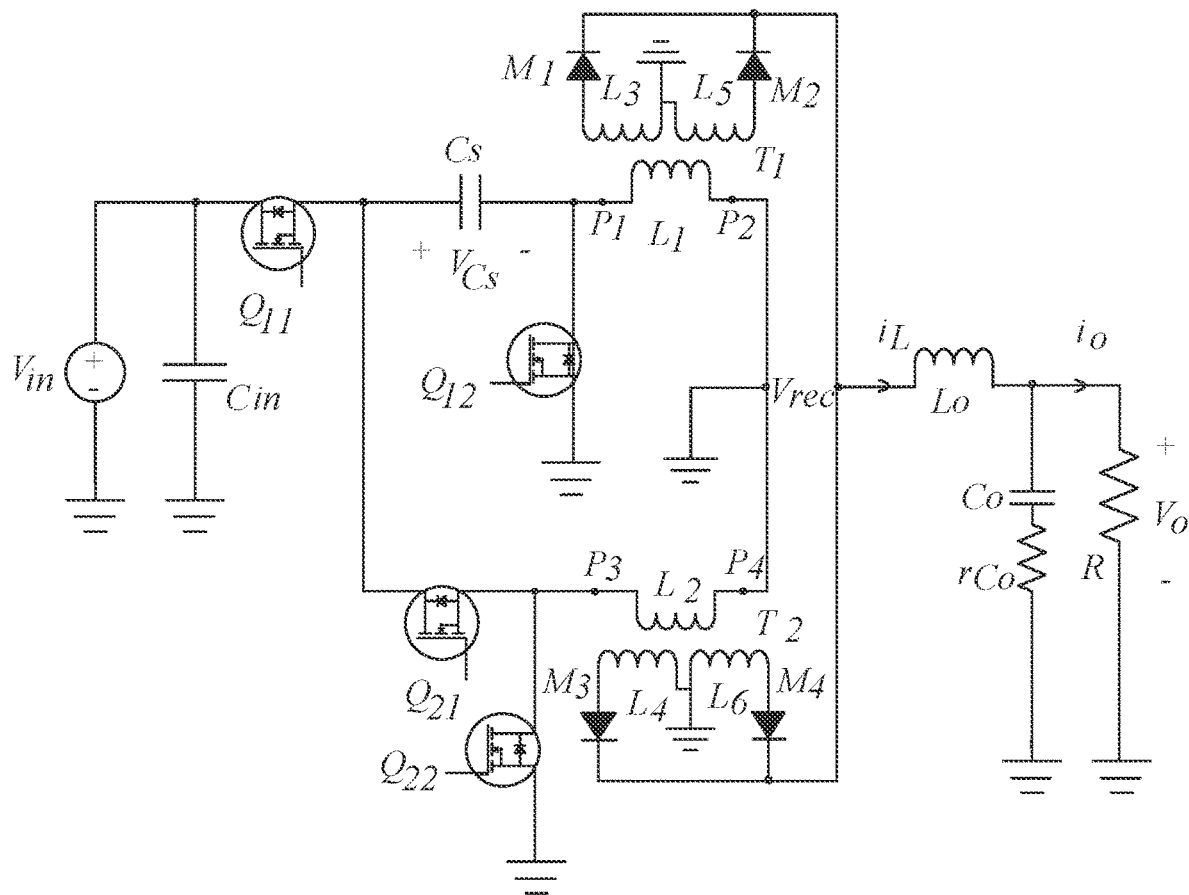
FIG. 10 illustrates an example type-II isolated 2-pscB converter with two grounded center-tapped rectifier transformers in accordance with an embodiment of the present disclosure.

FIG. 10 illustrates an example type-II isolated 2-pscB converter with two grounded center-tapped rectifier transformers (T1 and T2) in accordance with an embodiment of the present disclosure.

Figure 11:
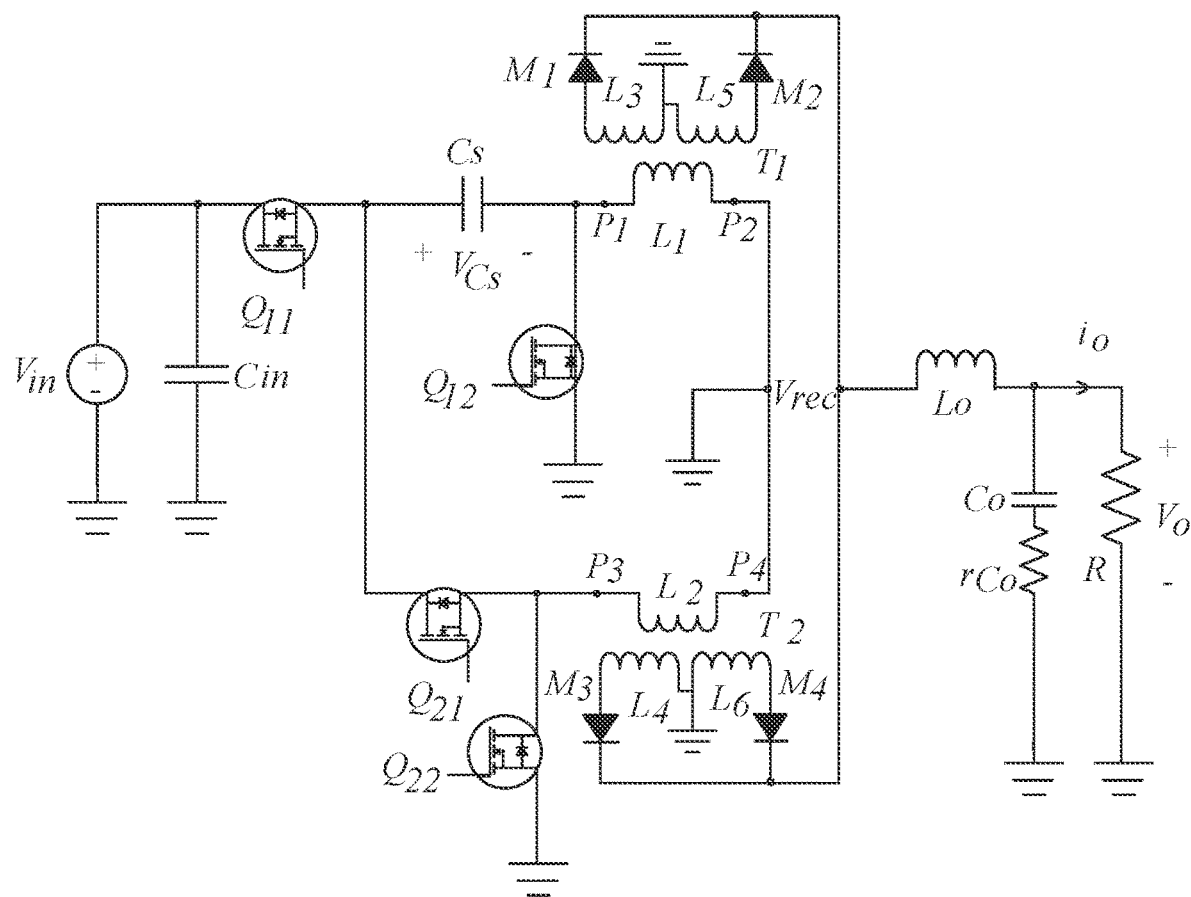
FIG. 11 illustrates an example type-III isolated 2-pscB converter using two center-tapped ideal transformers in accordance with an embodiment of the present disclosure.

FIG. 11 illustrates an example type-III isolated 2-pscB converter using two center-tapped ideal transformers (T1 and T2) in accordance with an embodiment of the present disclosure.

Figure 12:
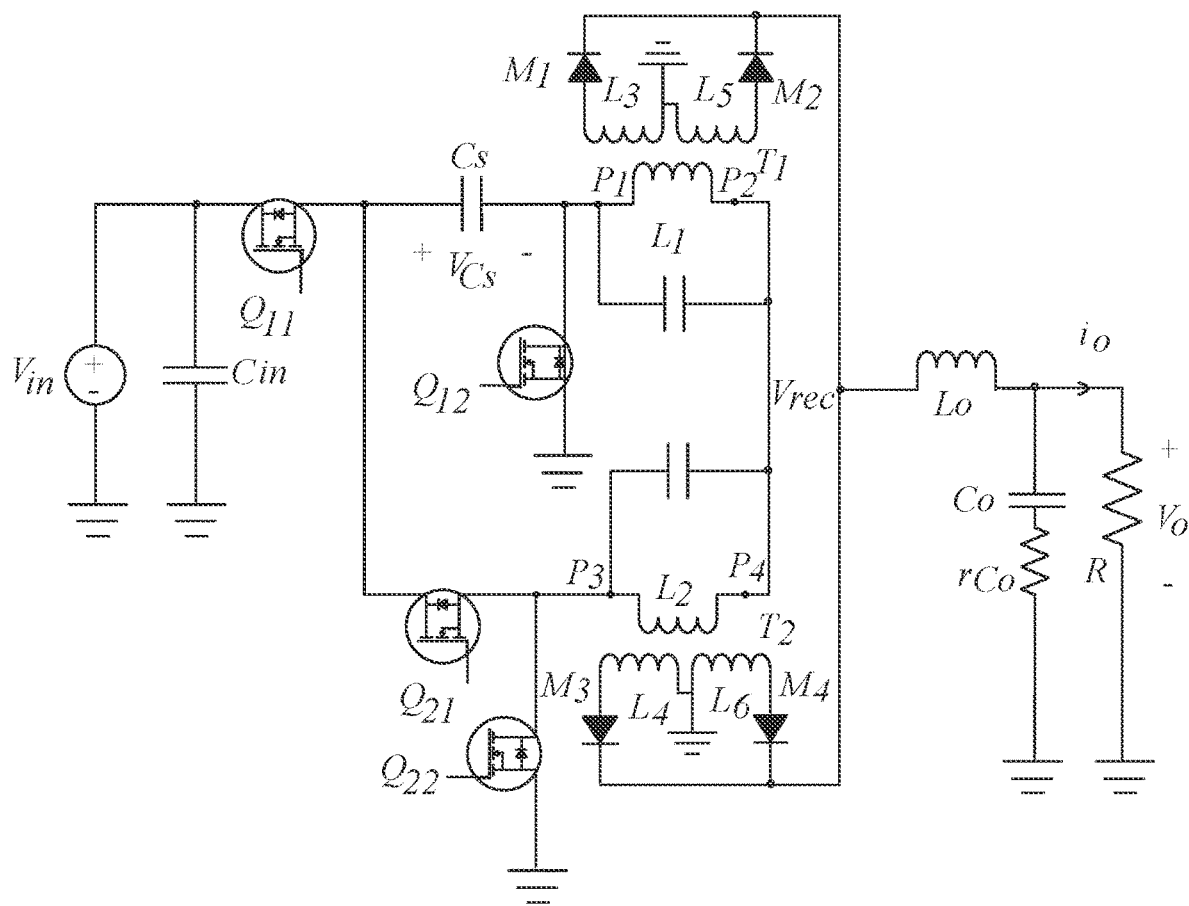
FIG. 12 illustrates an example type-IV isolated 2-pscB converter with two ungrounded center-tapped rectifier transformers in accordance with an embodiment of the present disclosure.

FIG. 12 illustrates an example type-IV isolated 2-pscB converter with two ungrounded center-tapped rectifier transformers (T1 and T2) in accordance with an embodiment of the present disclosure.

Figure 13:
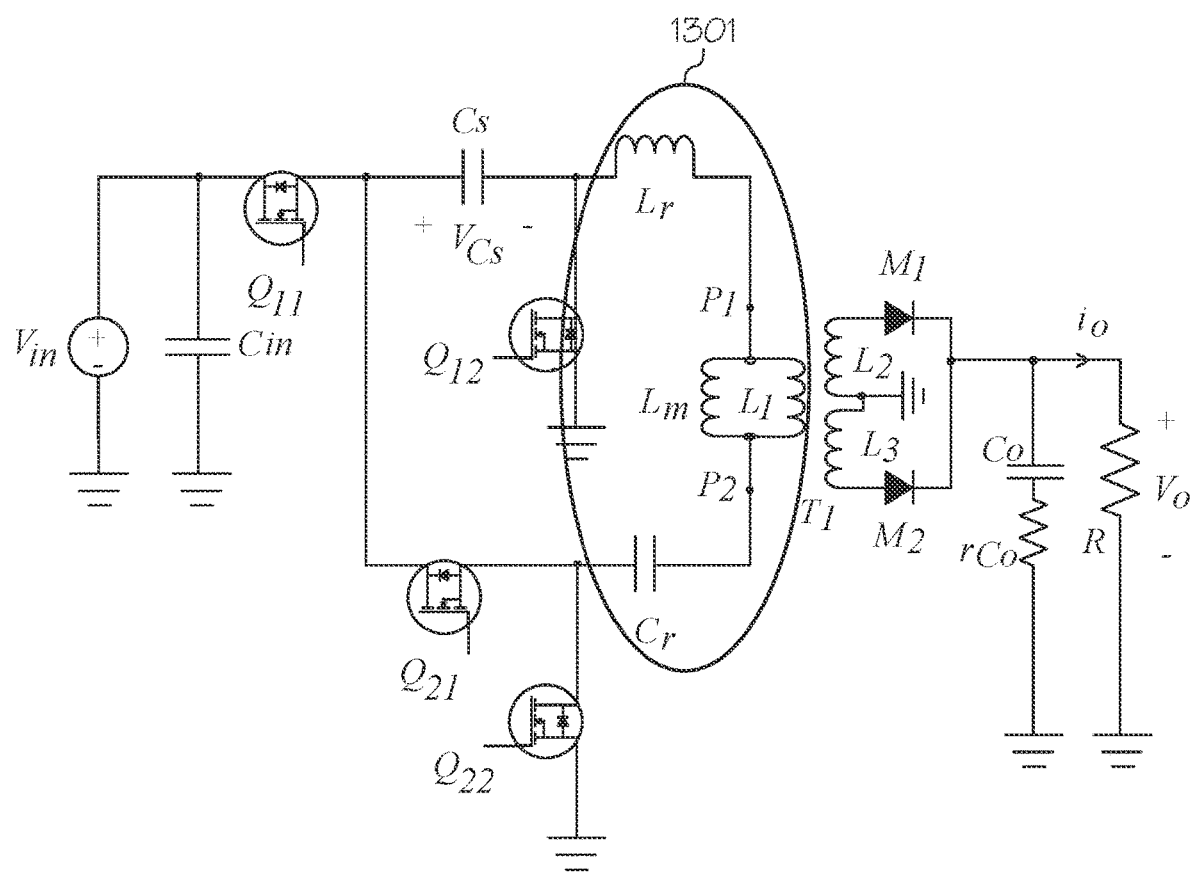
FIG. 13 illustrates a series capacitor in series with the LLC resonant tank to achieve better performance in terms of the soft switching mechanisms, ZVC and ZVS, in accordance with an embodiment of the present disclosure.

FIG. 13 illustrates a series capacitor ($C_s$) in series with the LLC (inductor-inductor-capacitor) resonant tank 1301 to achieve better performance in terms of the soft switching mechanisms, ZVC and ZVS, in accordance with an embodiment of the present disclosure.

Figure 14:
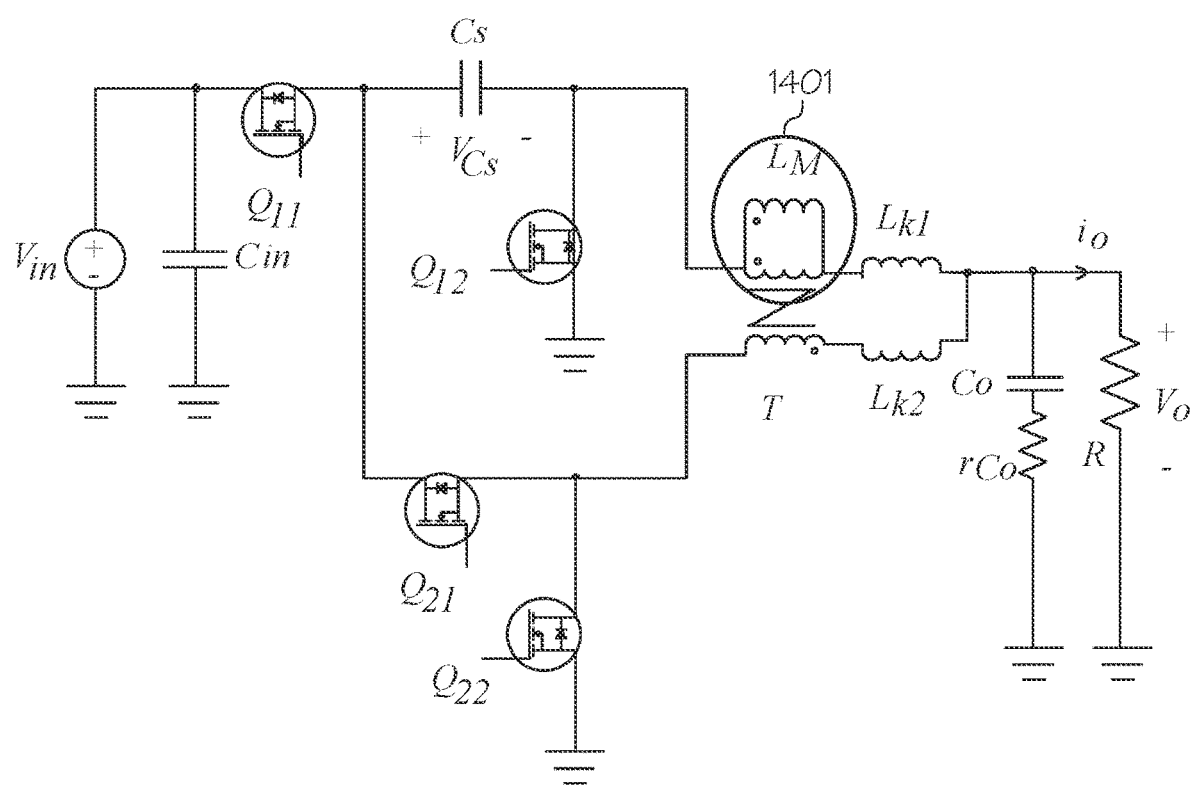
FIG. 14 illustrates a magnetic structure added to the multiple discrete inductors ($L_{K1}$ and $L_{K2}$) of the 2-pscB circuit in accordance with an embodiment of the present disclosure.

FIG. 14 illustrates a magnetic structure 1401 added to the multiple discrete inductors ($L_{K1}$ and $L_{K2}$) of the 2-pscB circuit in accordance with an embodiment of the present disclosure. In particular, as introduced in FIG. 14, a single magnetic structure 1401 is added to multiple discrete inductors ($L_{K1}$ and $L_{K2}$) of the 2-pscB circuit based on the "inductor-less" conversion strategy concept. The 2-pscB converter is magnetically coupled to cancel AC flux and ripple current with two-phase inverse coupled transformer "Type-I" (T), hence, it can be called a "2-pscB transformer-coupled" converter. Another reason for coupling is to enable the use of smaller inductor sizes to improve transient time without increasing current ripple which allows a significant reduction in output filter capacitance. A coupled inductor reduces overall voltage transient overshooting by half without sacrificing efficiency, and output ripple is reduced by more than double in comparison to an uncoupled inductor for the same converter conditions (load and output capacitors). This ripple cancellation due to coupled inductors can be extended to inductors and switches. When specific duty cycles are applied, a constant output voltage can be obtained at the leakage inductances' ($L_{k1}$, $L_{k2}$) output with a phase shift of 180 degrees. The circuit has leakage inductances $L_{k1}$, $L_{k2}$, an ideal transformer, and a single magnetizing inductance $L_M$, which can be used to model any linear magnetic structure with two windings. As with all structures, when the turns of the two windings are the same, the turn ratio of the ideal transformer is 1:1. The leakage gap configurations and gap lengths affect the values of $L_{k1}$ and $L_{k2}$ (which are equal by symmetry) and $L_M$. The ideal transformer (with the polarity shown in FIG. 14) forces the AC currents in the two phases to be equal. Consequently, this will improve and assist the topology's inherited current sharing mechanism. Thus, the AC currents in the two leakage inductances, $L_{k1}$ and $L_{k2}$, are also equal, assuming that (based on symmetry) the leakage inductances are equal. With equal AC currents, the leakage inductances also have identical voltages across them.

In various embodiments, in order to achieve the best coupling between windings, the transformer (T) is specifically intended for transferring power from one winding to another, the leakage inductance is zero, and the absolute inductance of each winding with the other is open which is often not of great concern. In one embodiment, the transformer (T) is replaced by coupled inductors, and each winding still uses its inductance separately. Although some coupling is being utilized, there are two separate inductors. Leakage inductance is less of a concern, and it can be useful to have some guaranteed separate (non-coupled or leakage) inductance for each winding. The absolute inductance of each winding when the other is open is also an important parameter that will be well specified. In one embodiment, in order to save magnetic materials and reduce the loss of magnetic materials, a core leg is shared between the two inductors in the 2-pscB converter. For leakage inductance, this is similar to a converter running on an input voltage of $V_{IN}/2$, switching at twice the actual switching frequency $f_S$. The on-time is unchanged, but the apparent duty cycle is twice the original duty cycle so that the output voltage is the same as its value without coupling.

Figure 15:
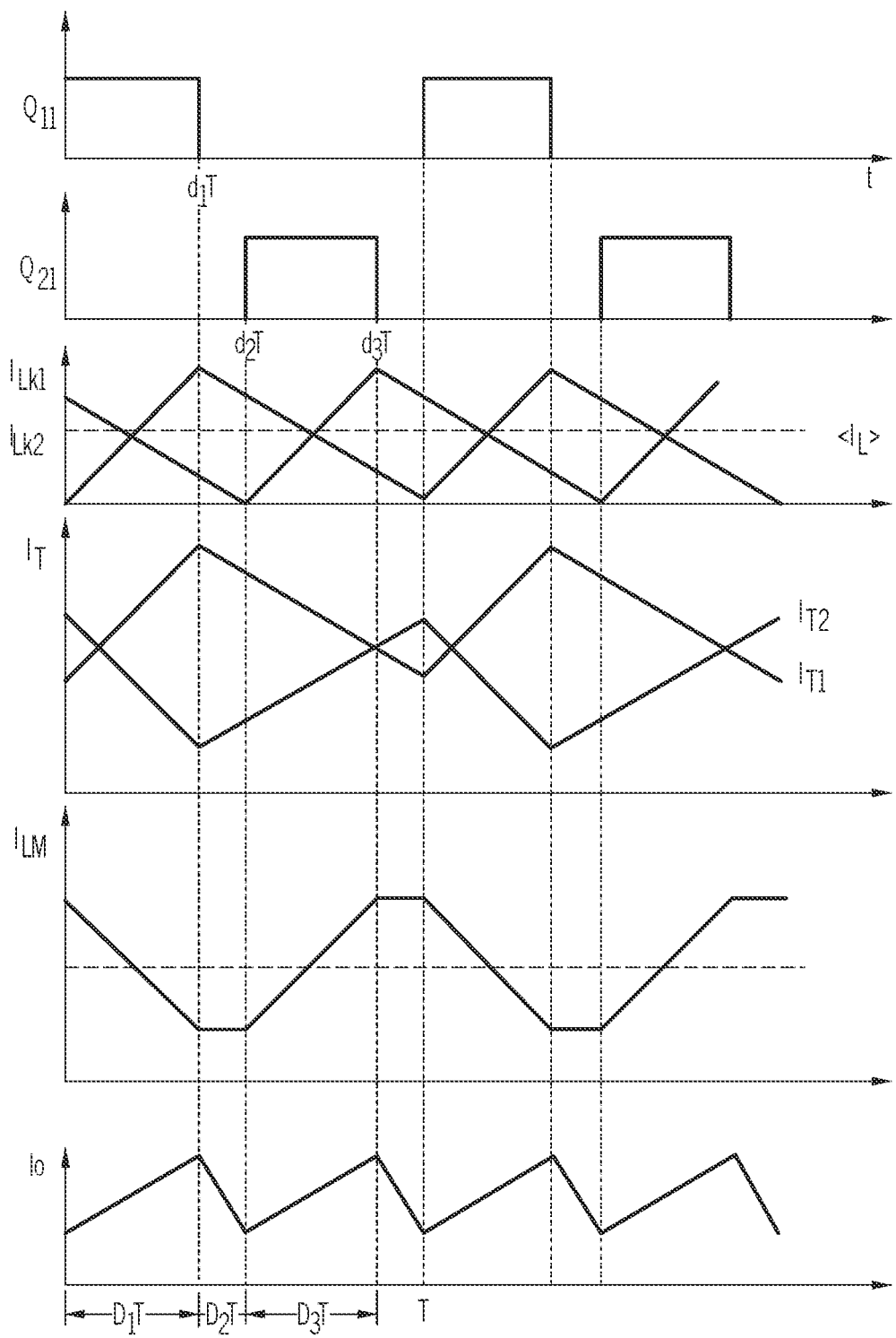
FIG. 15 illustrates an example of the 2-pscB converter waveform with a two-phase coupled Type-I transformer in accordance with an embodiment of the present disclosure.

FIG. 15 illustrates an example of the 2-pscB converter waveform with a two-phase coupled Type-I transformer in accordance with an embodiment of the present disclosure.

Figure 16:
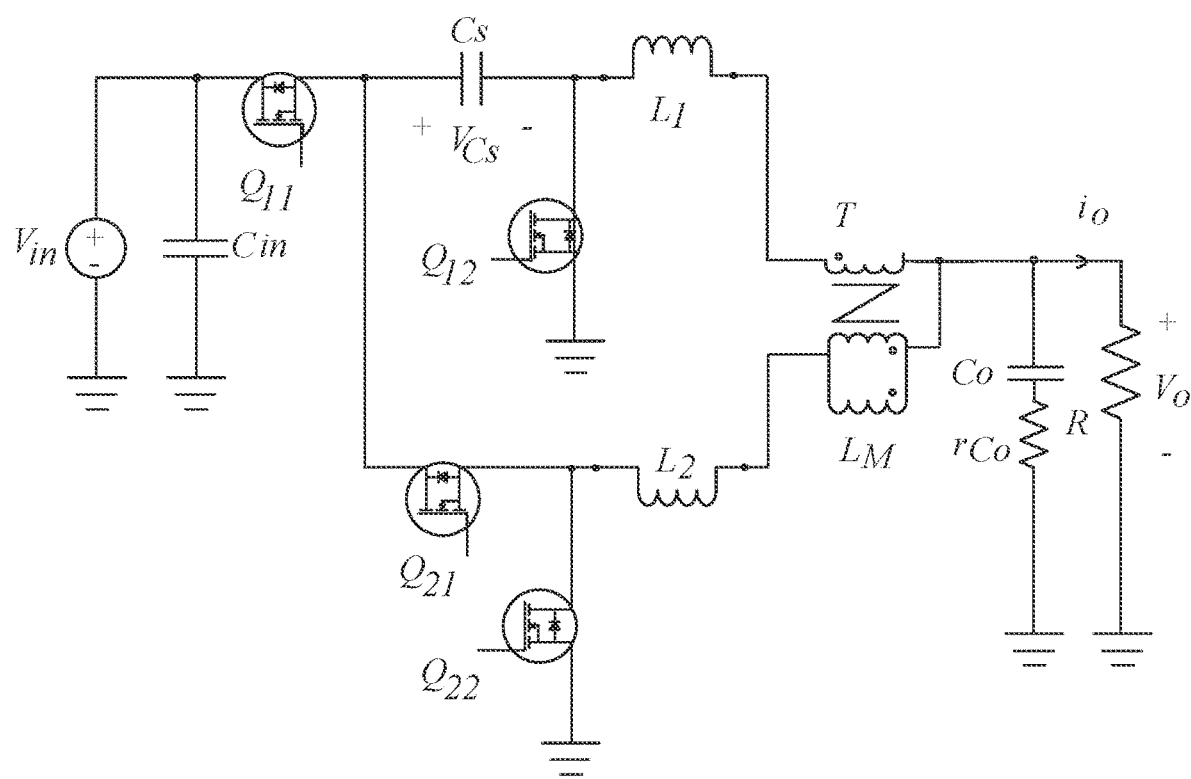
FIG. 16 illustrates an ideal transformer (T) or coupled inductors with two separate phase inductors and a single magnetizing inductance in accordance with an embodiment of the present disclosure.

FIG. 16 illustrates an ideal transformer (T) or coupled inductors with two separate phase inductors ($L_1$ and $L_2$) and a single magnetizing inductance $L_M$, 2-pscB converter with a two-phase coupled transformer Type-II in accordance with an embodiment of the present disclosure. In one embodiment, the ripple cancellation due to coupled inductors can be improved by adding phase inductors.

Figure 17:
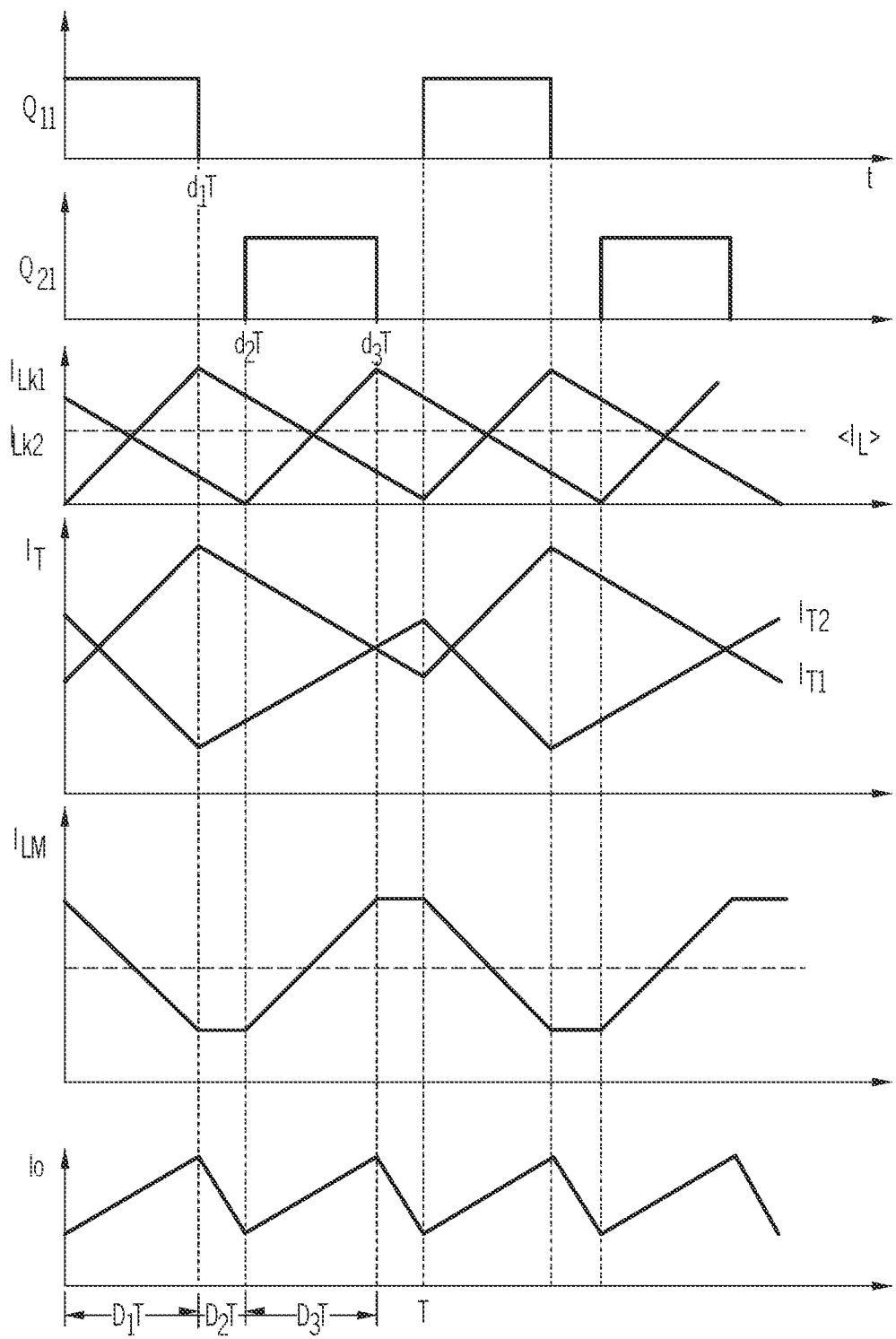
FIG. 17 illustrates example waveforms for the circuit of FIG. 16 in accordance with an embodiment of the present disclosure.

FIG. 17 illustrates example waveforms for the circuit of FIG. 16 in accordance with an embodiment of the present disclosure.

Figure 18:
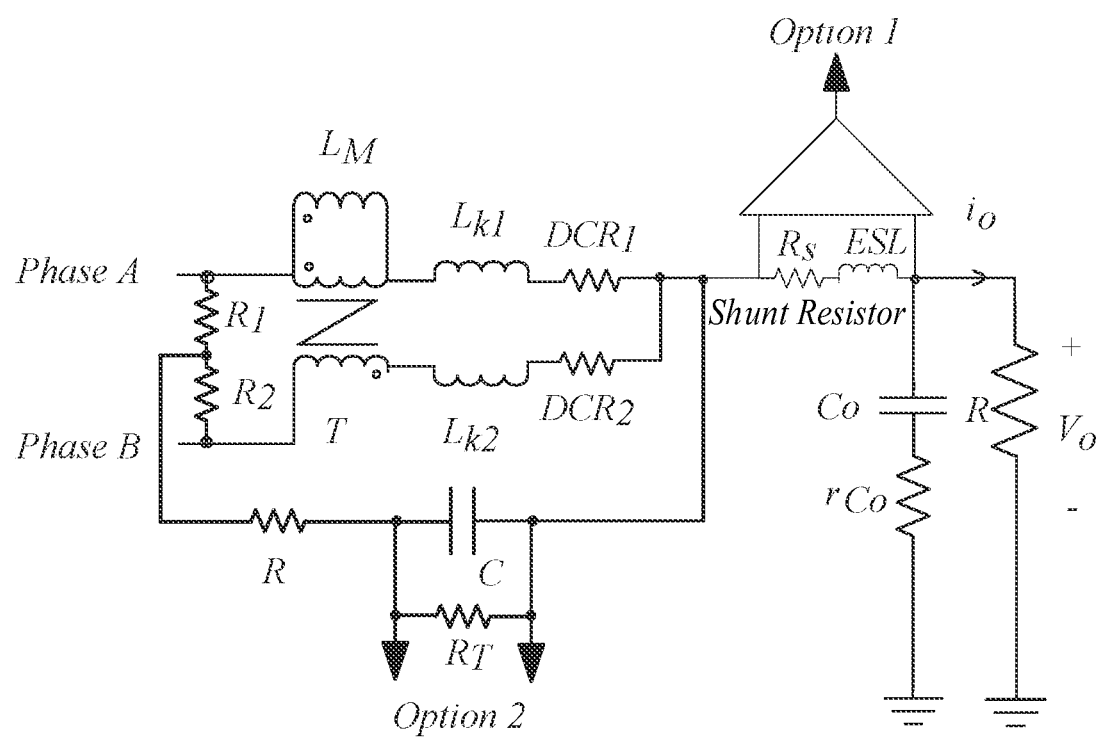
FIG. 18 illustrates two options for current sensing in accordance with an embodiment of the present disclosure.

FIG. 18 illustrates two options for current sensing in accordance with an embodiment of the present disclosure. The first option is for the lowest sensing error and a very low temperature coefficient, using a current-sensing resistor ($R_S$) with parasitic inductance (also referred to as effective series inductance, or ESL) in series. The second option of inductor DC resistance (DCR) current sensing consists of a resistor R, a capacitor C for one phase, and two other resistors $R_1$ and $R_2$ which are shared by the two phases. Under some circumstances, it may be necessary to use a resistor divider to scale down the sensed current or to compensate for the temperature variation. In one embodiment, the resistor divider includes a resistor $R_T$ in parallel with the capacitor C. The parasitic resistance of the inductor winding is used to measure current thereby eliminating the sense resistor. Such an embodiment reduces component costs and increases power supply efficiency. In such an embodiment, there is no need for current sensors for each phase since the inherited current sharing mechanism exists.

Figure 19:
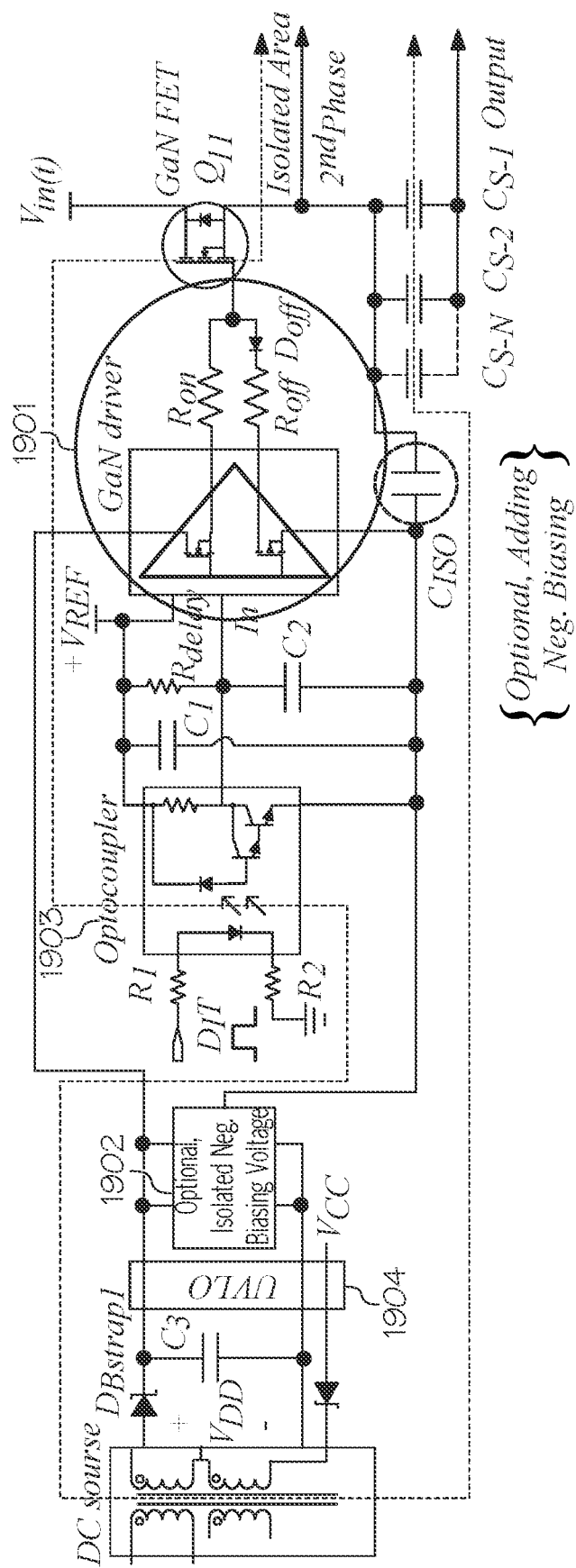
FIG. 19 illustrates an example of gallium nitride (GaN) gate driver circuitry in accordance with an embodiment of the present disclosure.

FIG. 19 illustrates an example of gallium nitride (GaN) gate driver circuitry 1901 in accordance with an embodiment of the present disclosure.

Referring to FIG. 19, FIG. 19 illustrates a 2-pscB converter isolated Gallium Nitride (GaN) switches gate driver circuitry 1901 that is used with all previous topologies. The positive side of $C_S$ is the gate reference voltage for the isolated high-side switch. The reference voltage of the low-side switch circuit is grounded; therefore, its gate voltage requires a different isolation loop. $C_{ISO}$ works as an isolating capacitor to prevent any direct conduction between the high-side driver and the synchronous rectifier switch driver due to the voltage storage element of $C_S$ in between. In one embodiment, such a capacitor is not necessary unless there is a need to provide a negative bias (see 1902) of 5 V or less to the $V_{GS}$ signal. In one embodiment, the anode of bootstrap diode, $D_{Bstrap1}$, is connected to a driver power source, $V_{DD}$. In one embodiment, converter gate drivers are placed as close to the GaNs switches (e.g., $Q_{11}$) as possible to minimize voltage spikes and electromagnetic interference (EMI) from self-inductance and self-resistance of the circuit traces. In one embodiment, each gate power supply is obtained directly from the controller IC's internal LDOs (low dropouts) or an embedded isolated transformer. In an alternative embodiment, galvanic optocouplers 1903 with 5 volts terminals are directly connected to the gate driver LDOs. In one embodiment, a voltage divider is added to provide negative driving to the circuit with negative $V_{GS}$. The under-voltage lockout protection circuit UVLO 1904 works by comparing a positive gate voltage to a voltage lockout reference voltage selected for under-voltage protection and losing base current if the gate voltage falls below this reference voltage whereby an under-voltage lockout fault signal is generated.

Figure 20:
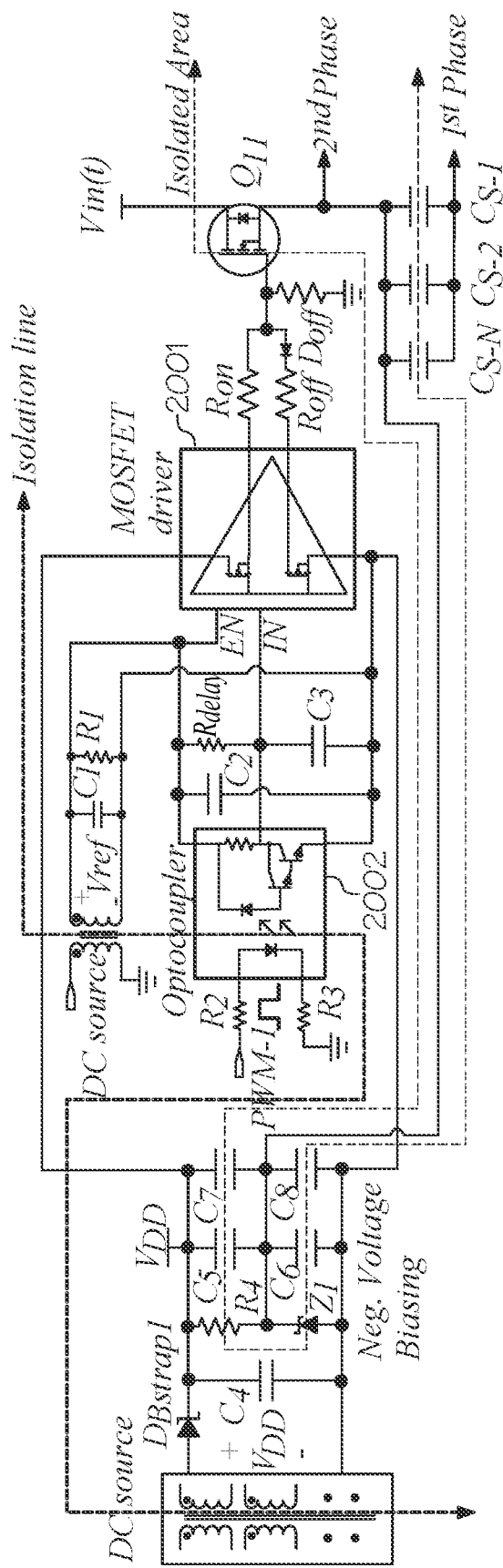
FIG. 20 illustrates an example of a schematic representation of the circuit configuration of a metal-oxide semiconductor field-effect transistor (MOSFET) isolated gate driver of the isolated 2-pscB converter in accordance with an embodiment of the present disclosure.

FIG. 20 illustrates an example of a schematic representation of the circuit configuration of a metal-oxide semiconductor field-effect transistor (MOSFET) isolated gate driver 2001 of the isolated 2-pscB converter in accordance with an embodiment of the present disclosure.

Referring to FIG. 20, the gate reference voltage for the isolated high-side switch is the positive side of $C_S$, whereas. the gate voltage for the isolated low-side switch circuit requires a different isolation loop since its reference voltage is ground. As such, an isolation scheme encompasses the entire high-side switch circuit because inserting a series capacitor will introduce a time delay between the gate voltages of the two switches. This series capacitor voltage interferes with the synchronization of the switching time and voltage level. Heat in an electrolytic capacitor is generated by ripple current flowing through its equivalent series resistance (ESR) so a series capacitor's root mean square (RMS) ripple current rating needs to be verified to meet or exceed the value specified by the manufacturing.

Since ceramic capacitors have a low ESR and can filter the large currents generated by SMPS, they are well-suited for managing ripple currents. This makes ceramic capacitors more capable of handling the heat profile and less likely to heat up during turn-on, which makes them more suitable as series capacitors.

In general, complete isolation is required to isolate the ground loops. That is, there should be no direct conduction path between the high side driver 2001 and the synchronous rectifier switch driver 2002 (lower side) of the phase A circuit due to the voltage storage element of $C_S$ in between. In one embodiment, the anode of $D_{Bstrap1}$ bootstrap diode is connected to a driver source $V_{DD}$. Therefore, bootstrap capacitors $C_5$ to $C_8$ are charged by a voltage difference between the driver source voltage $V_{DD}$ and the series capacitor voltage $V_{Cs}$ during the on times of the $Q_{12}$ switch (see FIG. 1) through the bootstrap diode $D_{Bstrap1}$. Since the four bootstrap diodes of topology gate drivers are isolated using isolated DC sources, the gate voltages of the main switches $Q_{11}$ and $Q_{21}$ are enough to charge the bootstrap capacitors of phase A. As such, phase B uses the same gate drivers as phase A. In one embodiment, in order to reduce the cost of the four matched bootstrap capacitors for each gate driver, $C_5$ to $C_8$, two of them can be eliminated.

In one embodiment, metal-oxide semiconductor field-effect transistor (MOSFET) isolated gate driver 2001 drives different MOSFETs (e.g., $Q_{11}$) at different gate bias voltages ($V_{gs}$) between −5 V and 20 V.

In general, the gate driver should be located as close to the MOSFETs as possible. In one embodiment, single-gate drivers are used in the gate driving circuit of FIG. 20. In one embodiment, in order to improve the noise immunity (ground noise), a voltage divider is added to provide negative voltage bias capability to the gate circuit for switches with negative $V_{GS}$ that can be controlled using the right-rated Zener diodes and capacitors. In one embodiment, all power supplies are completely isolated for the high side gate drivers (e.g., driver 2001).

Figure 21:
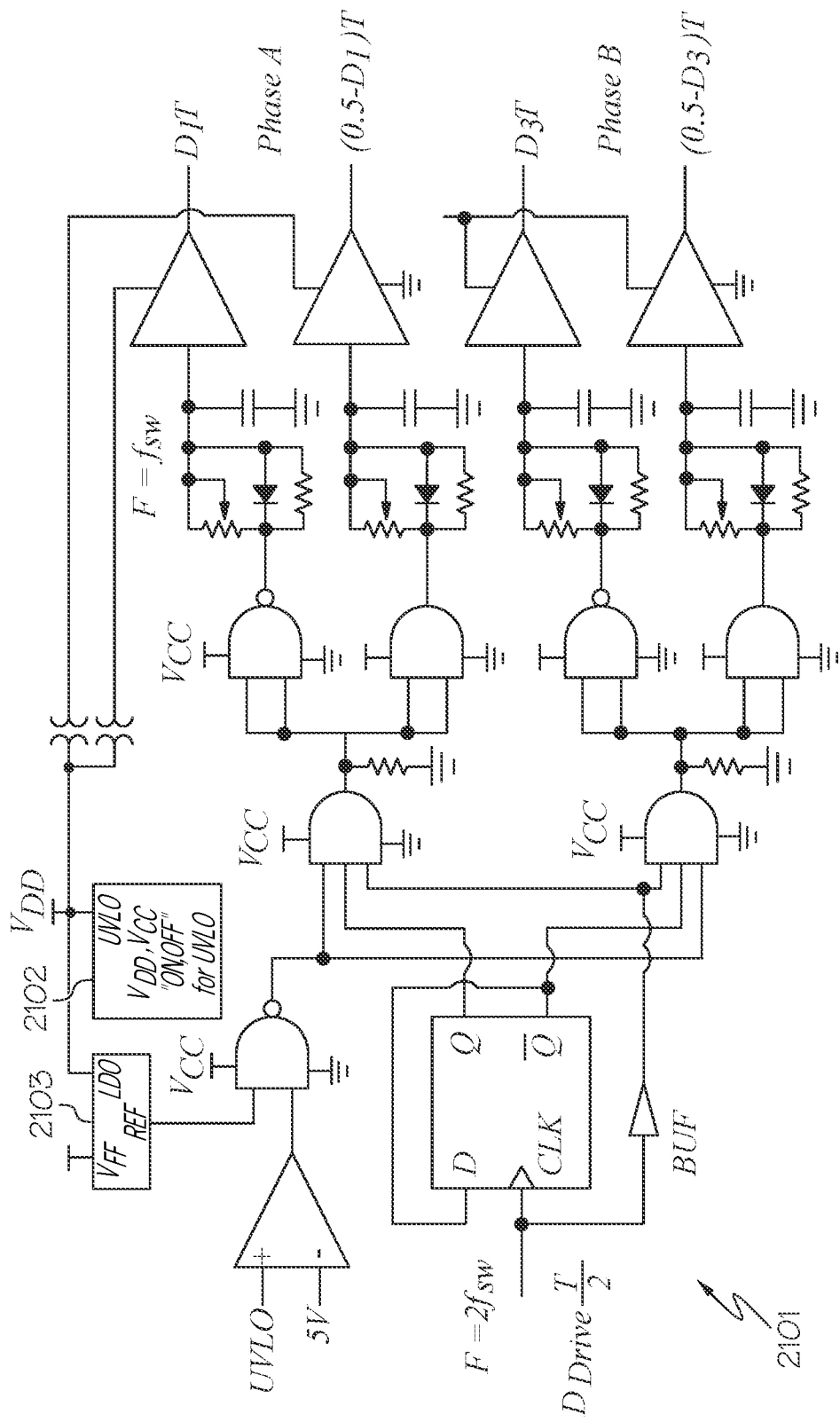
FIG. 21 illustrates an example of a converter modulation logic circuit in accordance with an embodiment of the present disclosure.

Referring now to FIG. 21, FIG. 21 illustrates an example of a converter modulation logic circuit in accordance with an embodiment of the present disclosure. In particular, FIG. 21 illustrates the completion of the previous circuits of FIGS. 19 and 20, where the main input PWM signal ($D_{drive}$) is at twice the actual converter switching frequency $f_S$ of 50% duty cycle or less to generate four signals at a switching frequency of 25% duty cycle or less. Therefore, it becomes easier to control the four gate signals using a CMOS logic circuit and can be done with only one input PWM signal. The configuration of FIG. 21 provides several significant advantages over conventional two feedback control loop schemes. As shown in FIG. 21, there is a single control loop with one modulator 2101 (instead of four) for two phases, which minimizes time propagation delay and layout voltage drop while having a fast response to output current changes. Additionally, the ability to generate two duty cycle pulses, $D_1$ and $D_3$, within one ramp signal cycle avoids sensing inaccuracies. This can potentially reduce complexity, controller size and component count. During the event that the voltage falls below the operational value, an undervoltage-lockout (UVLO) 2102 circuit turns off the power of an electronic device. Internal LDO regulator 2103 is provided for control of voltage shifting circuits.

Figure 22:
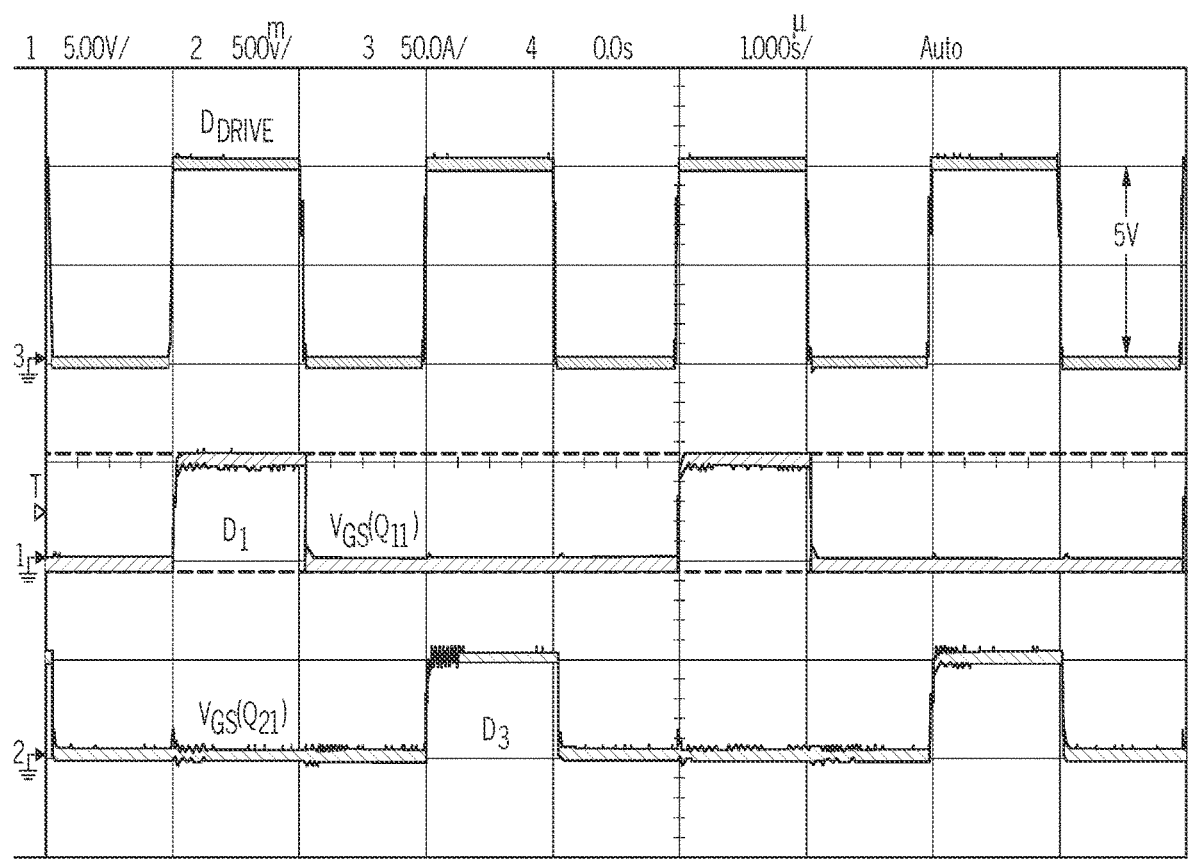
FIG. 22 illustrates lab testing waveforms of the PWM signal ($D_{drive}$) and phases A and B duty cycles generated from FIG. 21 in accordance with an embodiment of the present disclosure.

FIG. 22 illustrates lab testing waveforms of the PWM signal ($D_{drive}$) and phases A and B duty cycles generated from FIG. 21 in accordance with an embodiment of the present disclosure.

Figure 23:
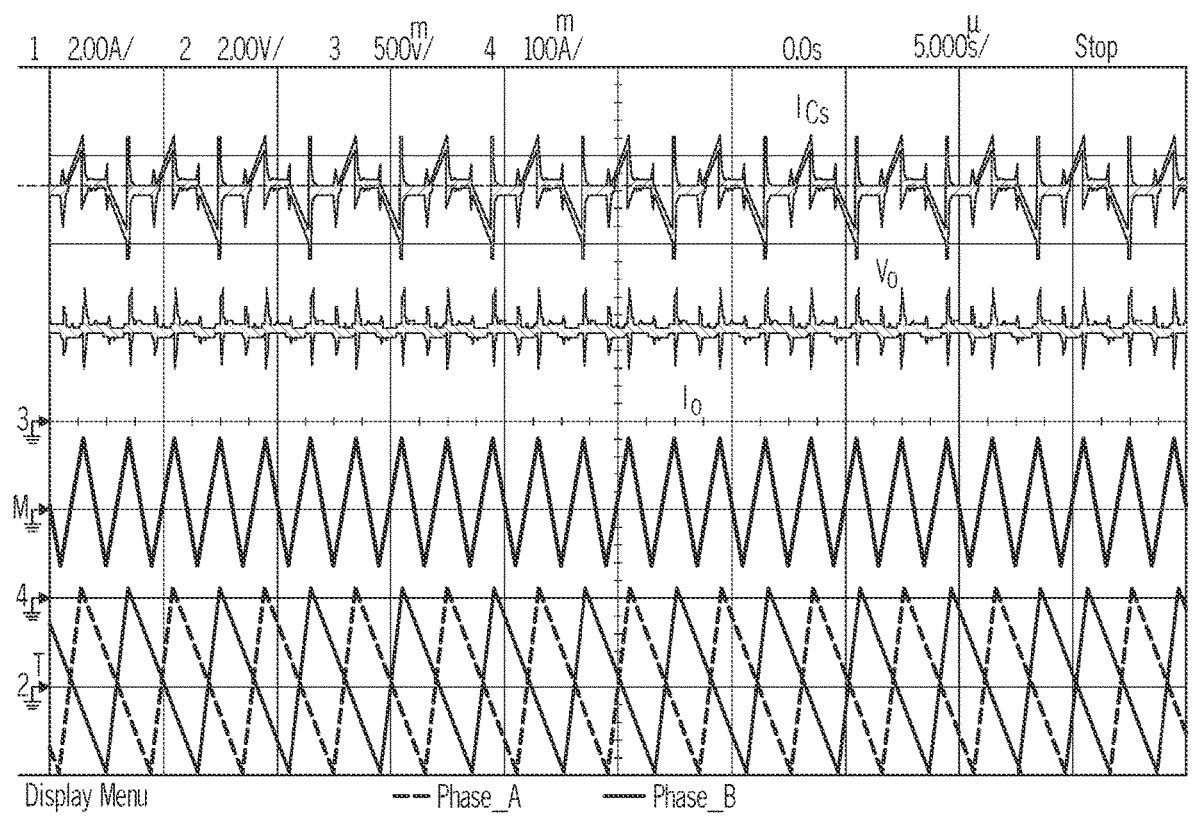
FIG. 23 illustrates lab testing waveforms of typical series capacitor current, output voltage, inductor current and output current generated from FIG. 21 in accordance with an embodiment of the present disclosure.

FIG. 23 illustrates lab testing waveforms of typical series capacitor current, output voltage, inductor current and output current generated from FIG. 21 in accordance with an embodiment of the present disclosure.

Figure 24:
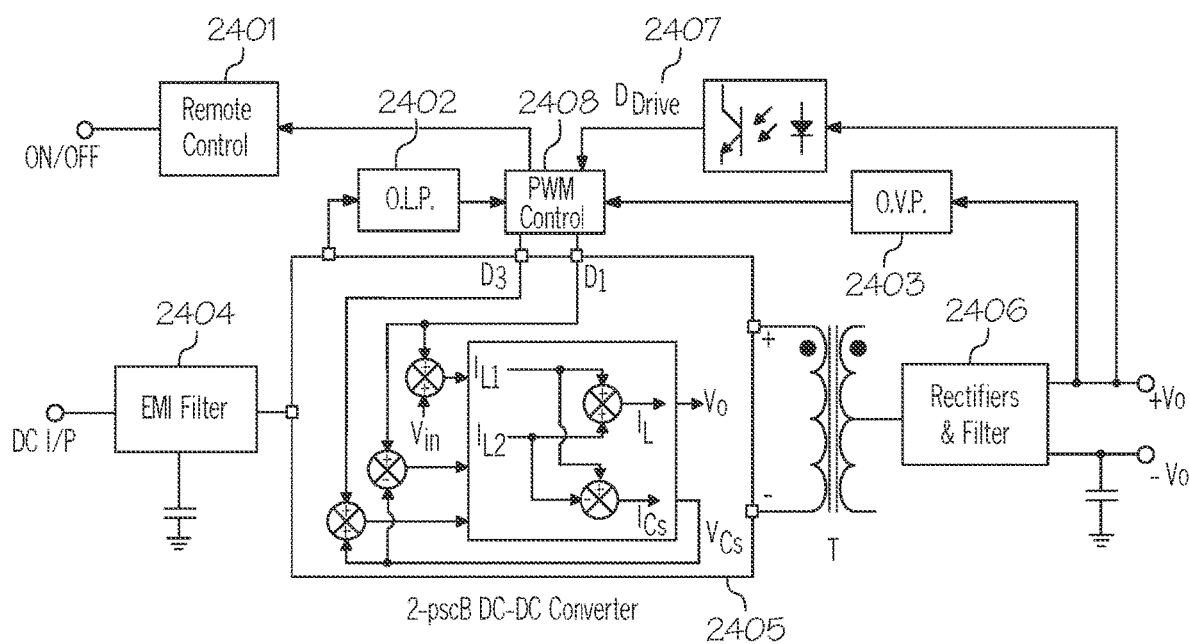
FIG. 24 illustrates an example of a complete converter block diagram with EMI protection components in accordance with an embodiment of the present disclosure.

FIG. 24 illustrates an example of a complete converter block diagram with EMI protection components in accordance with an embodiment of the present disclosure.

As shown in FIG. 24, FIG. 24 illustrates an example block diagram that summarizes the isolated 2-pscB topology, which includes protection components, such as remote control 2401. overvoltage protection (O.V.P.) 2403, overload protection (O.L.P.) 2402 and ripple cancellation circuits 2406 at I/O. Furthermore, FIG. 24 illustrates an EMI (electromagnetic interference) filter 2404 that suppresses interference generated by the input power (I/P) (e.g., DC I/P) or by other equipment and protects against electromagnetic interference signals present in the environment. In one embodiment, EMI filter 2404 includes components to eliminate differential and common-mode interference.

FIG. 24 additionally illustrates the main input PWM signal ($D_{drive}$) 2407 used to drive PWM control 2408 to generate digital signals to control power applications, such as the 2-pscB DC-DC converter 2405 (see, e.g., FIGS. 10-12).

Furthermore, FIG. 24 illustrates rectifiers and filter 2406, which includes rectifiers and filters for converting alternating current (AC) to direct current (DC). The output of rectifiers and filters 2406 corresponds to $D_{drive}$ 2407 and overvoltage protection (O.V.P.) 2403. Additionally, as shown in FIG. 24, the output of EMI filter 2404 is overload protection (O.L.P.) 2402 where O.V.P. 2403 and O.L.P. 2402 are inputted into PWM control 2408.

In various embodiments, an integrated circuit (IC) implementation of the 2-pscB can be utilized for high-voltage applications. The chip can include typical protection circuits, such as input under- or overvoltage lockout for each phase and output under- or overvoltage protection and overcurrent protection. In one embodiment, chip synchronization is connected to an external clock, and new features can be included to manage the series capacitor voltage according to the controller method's requirements. In one embodiment, the converter (e.g., converter 2405) is designed to operate at a high frequency above 500 kHz per phase switching frequency and work for input voltages up to 380 volts.

Figure 25:
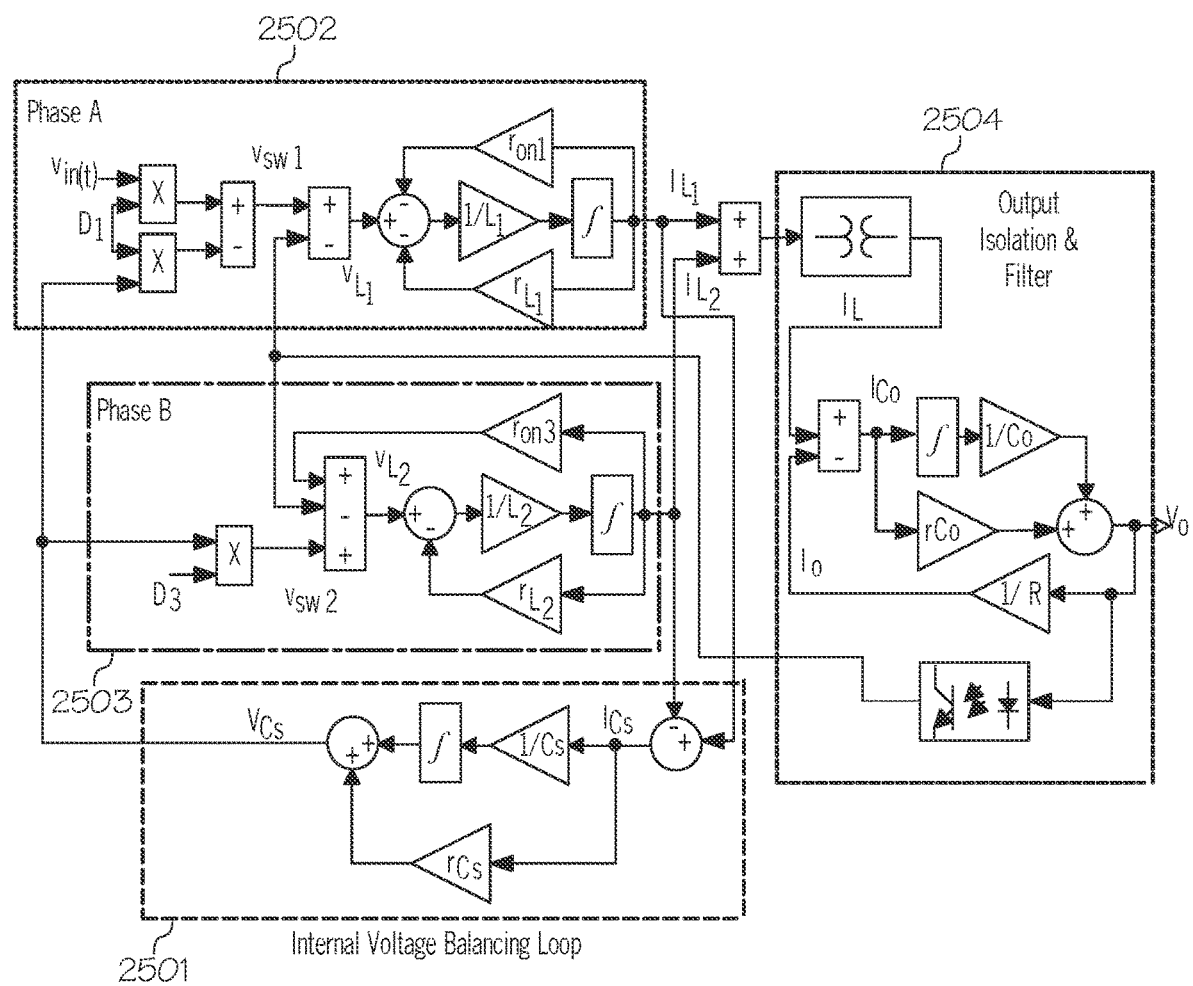
FIG. 25 illustrates a simplified mathematical representation of the I-2pscB topology with its internal current sharing mechanism resulting from the series capacitor voltage internal loop in accordance with an embodiment of the present disclosure.

FIG. 25 illustrates a simplified mathematical representation of the I-2pscB topology with its internal current sharing mechanism resulting from the series capacitor voltage internal loop in accordance with an embodiment of the present disclosure.

The current sharing mechanism (CSM) concept is a feature of the 2-pscB and I-2pscB topology, where the series capacitor voltage ($v_{Cs}$) varies internally in magnitude to balance the two-phase currents. For non-isolated topology, the working equations are expressed as follows:

$$D_1(v_{in}-V_{Cs})-v_{Cs}D_3=0 \quad \text{Equation (8)}$$

$$D_1(v_{in}-V_{Cs})+v_{Cs}D_3-2v_0=0 \quad \text{Equation (9)}$$

FIG. 25 shows a simplified mathematical representation of the I-2pscB topology with its internal current sharing mechanism resulting from the $v_{Cs}$ 2501. This block aims to generate a reference trajectory to be used by the controller model. The average model mathematical representation includes the main parasitic components and the CSM using series capacitor voltage. Assuming all initial conditions are zero, and parasitic components are neglected, the system can be represented as:

$$c_s \frac{d^2 v_{Cs}}{dt^2} + v_{Cs}\left(\frac{D_1}{L_1} + \frac{D_3}{L_2}\right) = v_{in}\frac{D_1}{L_1} + v_o\left(\frac{1}{L_2} - \frac{1}{L_1}\right) \quad \text{Equation (10)}$$

$$c_o \frac{d^2 v_o}{dt^2} + \frac{1}{R}\frac{dv_o}{dt} + v_o\left(\frac{1}{L_1} + \frac{1}{L_2}\right) = v_{in}\frac{D_1}{L_1} + v_{cs}\left(\frac{D_3}{L_2} - \frac{D_1}{L_1}\right) \quad \text{Equation (11)}$$

Taking the Laplace transformation of (10) and (11) yields $$V_{Cs}(s) = V_{in}(s)\frac{\alpha}{\beta S^2 + 1} + V_o(s)\frac{\gamma}{\beta S^2 + 1} \quad \text{Equation (12)}$$

$$= \text{Steady state part} + \left\{\begin{array}{l}\text{transient state function part}\\ \text{unequal phase parasitic noise}\end{array}\right.$$

The transient time is a function of the inductance values and the matching current paths. Hence:

$$\alpha = \frac{D_1 L_2}{D_1 L_2 + D_3 L_1}, \beta = \frac{C_s L_1 L_2}{D_1 L_2 + D_3 L_1}, \gamma = \frac{L_1 - L_2}{D_1 L_2 + D_3 L_1} \quad \text{Equation (13)}$$

If both phase inductances (inductances of phase A 2502 and phase B 2503) are similar, then the difference between current loops is negligible and therefore can be ignored. Equation (13) reduces to:

$$\frac{V_{Cs}(s)}{V_{in}(s)} = \frac{\alpha}{\beta S^2 + 1} \quad \text{Equation (14)}$$

$$\alpha = \frac{D_1}{D_1 + D_3}, \beta = \frac{C_s L}{D_1 + D_3}, \gamma = 0 \quad \text{Equation (15)}$$

Combined (10) to (11), the output-voltage (see element 2504) transfer function can be derived as $$\frac{V_o(s)}{V_{in}(s)} = \frac{C_s D_1 S^2 + \frac{2 D_1 D_3}{L_2}}{\left(C_O L_1 S^2 + S\frac{L_1}{R} + \frac{L_1}{L_2} + 1\right)} \\ \left(C_s S^2 + \frac{D_1}{L_1} + \frac{D_3}{L_2}\right) + \left(\frac{D_1}{L_2} - \frac{D_3 L_1}{L_2^2} + \frac{D_3}{L_2} - \frac{D_1}{L_1}\right) \quad \text{Equation (16)}$$

The previous output-voltage transfer function is expressed as:

$$H(s) = G_0 \frac{\frac{s^2}{\omega_z^2} + 1}{\left(\frac{s^2}{\omega_o^2} + \frac{s}{Q_0 \omega_o} + 1\right)\left(\frac{s^2}{\omega_p^2} + 1\right)} \quad \text{Equation (17)}$$

where:

$$G_0 = \frac{D_1 D_3}{D_1 + D_3}, \omega_o = \sqrt{\frac{2}{C_o L}}, Q_0 = R\sqrt{\frac{2C_o}{L}} \quad \text{Equation (18)}$$

$$\omega_z = \sqrt{\frac{2D_3}{C_s L}}, \omega_p = \sqrt{\frac{D_1 + D_3}{C_s L}} \quad \text{Equation (19)}$$

$\omega_0$ is the natural angular corner frequency. When $D_1=D_3=D$, then $\omega_z=\omega_p$ in (19). Thus, two zeros and two poles cancel each other. The output transfer function reduces to a second-order non-linear system equation.

$$H(s) = \frac{\frac{D}{2}}{\frac{s^2}{\omega_o^2} + \frac{s}{Q_0 \omega_o} + 1} \quad \text{Equation (20)}$$

The series-capacitor voltage transfer function is derived from (10) to (11).

$$\frac{V_{Cs}(s)}{V_{in}(s)} = \frac{G_{Cs}\left(\frac{s^2}{\omega_y^2} + \frac{s}{\omega_y Q_y} + 1\right)}{\left(\frac{S^2}{\omega_q^2} + \frac{S}{Q_q \omega_q} + 1\right)\left(\frac{S^2}{\omega_w^2} + 1\right) - \left[\frac{D_1 L_2(L_2^2 - L_1^2) + D_3 L_1(L_1^2 - L_2^2)}{D_1 L_2 + D_3 L_1}\right]} \quad \text{Equation (21)}$$

Where, $$G_{cs} = 2\frac{D_1}{D_1 L_2 + D_3 L_1}\frac{L_1 L_2}{L_1 + L_2} \quad \text{Equation (22)}$$

$$\omega_q = \sqrt{\frac{(L_1 + L_2)}{L_1 L_2 C_o}}, Q_q = R\sqrt{\frac{(L_1 + L_2)C_o}{L_1 L_2}} \quad \text{Equation (23)}$$

$$\omega_y = \sqrt{\frac{2}{C_o L_2}}, Q_y = R\sqrt{\frac{2C_o}{L_2}}, \omega_w = \sqrt{\frac{D_1 L_2 + D_3 L_1}{C_s L_1 L_2}} \quad \text{Equation (24)}$$

The last denominator term in (21) represents the mismatch between the two-phase inductance and capacitance. When the current share is fully utilized, $\omega_q=\omega_y$ and $Q_q\omega_q=Q_y\omega_y$ then (21) reduced to $$\frac{V_{Cs}(s)}{V_{in}(s)} = \frac{G_{Cs}}{\left(\frac{s^2}{\omega_w^2}+1\right)}, G_{cs} = \frac{1}{2} \qquad \text{Equation (25)}$$

The relationship between the output voltage (see element 2504) and the series capacitor voltage (see element 2501) becomes:

$$\frac{V_o(s)}{V_{Cs}(s)} = \frac{G_{cs}\left(\frac{s^2}{\omega_f^2}+1\right)}{\left(\frac{s^2}{\omega_m^2}+\frac{s}{Q_m\omega_m}+1\right)} \qquad \text{Equation (26)}$$

$$G_{cs} = D_3, \omega_f = \sqrt{\frac{2D_3}{L_2 C_s}} = \omega_m\sqrt{D_3}, Q_m = R\sqrt{\frac{2C_s}{L_2}} \qquad \text{Equation (27)}$$

The output of the series capacitor voltage transfer function acts as a notch filter (see element 2504), which removes only a narrow band of frequencies and passes the frequency components above and below the notch frequency. Accordingly, bandwidth (BW) frequency can be controlled by changing the distance between the poles and the two zeros (j, −j) as expressed in (28).

$$\frac{V_o(s)}{V_{Cs}(s)} = \frac{G_{cs}\left(\frac{s}{\omega_f}+j\right)\left(\frac{s}{\omega_f}-j\right)}{(S-p_1)(S-p_2)} \qquad \text{Equation (28)}$$

Studying the damped oscillation of the two-phase CSM on the parasitic changes of the system, after plugging the phases' current equations, the following equations are derived:

$$L_1\frac{di_{L1}(t)}{dt} = V_{in}D_1 - i_L r_{on1} - V_{Cs}D_1 - i_{L1}r_{Cs} - i_{L1}r_{L1} - V_o(t) \qquad \text{Equation (29)}$$

$$L_2\frac{di_{L2}(t)}{dt} = \qquad \text{Equation (30)}$$
$$-i_L r_{on2} + V_{Cs}D_3 - i_{L2}r_{Cs} - i_{L2}r_{on3} - i_{L2}r_{L2} - V_o(t)$$

Because both duty cycles affect the series capacitor current 2501, the complete current sharing equation will be:

$$\frac{d^2 i_{Cs}(t)}{dt^2} + \frac{1}{L}\left(\frac{di_{Cs}(t)}{dt}(r_L + r_{on} + r_{Cs}) + \frac{(D_1+D_3)}{Cs}i_{Cs}\right) = 0 \qquad \text{Equation (31)}$$

where $r_{on}$ and $r_{Cs}$ represent converter switches on-resistance and series capacitor resistive parasitic, respectively.

The result is a second-order homogeneous differential equation that represents the dampened harmonic oscillation nature with attenuation ($\zeta_{Cs}$) and angular resonant frequency of ($\omega_{Cs}$).

$$\frac{d^2 i_{Cs}(t)}{dt^2} + 2\zeta\omega_{Cs}\frac{di_{Cs}(t)}{dt} + \omega_{Cs}^2 i_{Cs} = 0 \qquad \text{Equation (32)}$$

$$\zeta = \frac{r_L}{2}\sqrt{\frac{Cs}{L(D_1+D_3)}}, \omega_{Cs} = \sqrt{\frac{(D_1+D_3)}{LCs}} \qquad \text{Equation (33)}$$

$$Q_{Cs} = \frac{1}{r_L}\sqrt{\frac{L(D_1+D_3)}{Cs}} \qquad \text{Equation (34)}$$

In one embodiment, the dampened harmonic oscillator is translated as "current perturbations," which represents the difference between the inductor average currents of the phases.

In various embodiments, the topology of the isolated 2-pscB can achieve various advantages, such as, for example, reducing the switching voltage level (e.g., reducing $V_{DS}$ by half). This leads to increased efficiency when switching losses $E_{oss}$ is reduced and becomes suitable for high-frequency switching.

Another advantage of the topology of the isolated 2-pscB is reducing output voltage ripple and current ripple by a third. Furthermore, an advantage of the topology of the isolated 2-pscB is reducing the size of the filter inductor by almost half.

Furthermore, an advantage of the topology of the isolated 2-pscB is to have the inductors act as current sources to softly charge and discharge the series capacitor in four-mode power stages (self-charging).

Furthermore, an advantage of the topology of the isolated 2-pscB includes flexible time intervals where the intervals can (nearly) be reduced to two as a regular buck.

Additionally, an advantage of the topology of the isolated 2-pscB includes automatic current balancing between phases which can be achieved very easily when the two inductors have the same size, the same storage energy and the inductors' current shapes are the same. In special cases, even if the inductors are not the same, manipulating the pulse intervals can achieve the current balancing by increasing the duty cycle of one or more switches.

In general, in such a topology of the isolated 2-pscB, there is no need to have any phase current sensing elements to achieve the current sharing, which is a very critical issue for distributing the heat, especially at high current demand.

Furthermore, by utilizing such a topology of the isolated 2-pscB, the duty ratio is doubled to meet the same specification as conventional buck converters for the same conversion ratio, which makes series capacitor buck converters easier to control at high-frequency applications.

Additionally, by utilizing the topology of the present disclosure of the isolated 2-pscB, adding transformers or coupled inductors is more efficient due to self-current sharing.

Conditional language used herein, such as, among others, "can," "might," "may," "e.g.," and the like, unless specifically stated otherwise, or otherwise understood within the context as used, is generally intended to convey those certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements, and/or states are included or are to be performed in any particular embodiment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A multiphase power converter, comprising:
   at least one transformer providing isolation in said multiphase power converter,
   wherein said multiphase power converter is a series capacitor Buck converter;
   a series capacitor in a series capacitor configuration;
   a plurality of switches connected within said series capacitor configuration; and
   a controller electrically coupled to said series capacitor and said plurality of switches, wherein said controller is configured to control power output by causing said plurality of switches to be switched according to a plurality of switching intervals of a period.

2. The multiphase power converter as recited in claim 1, wherein said at least one transformer comprises a full-wave bridge rectifier transformer.

3. The multiphase power converter as recited in claim 1, wherein said at least one transformer comprises a center-tapped ideal transformer.

4. The multiphase power converter as recited in claim 1, wherein said at least one transformer comprises a first transformer for a first phase of said multiphase power converter and a second transformer for a second phase of said multiphase power converter.

5. The multiphase power converter as recited in claim 1, wherein an input power of said multiphase power converter is connected to a regulated direct current (DC) power source.

6. The multiphase power converter as recited in claim 1, wherein an input power of said multiphase power converter is connected to an alternating current (AC) distribution grid.

7. The multiphase power converter as recited in claim 6, wherein said input power of said multiphase power converter is connected to said alternating current (AC) distribution grid through an electromagnetic interference filter.

8. The multiphase power converter as recited in claim 1, wherein said multiphase power converter comprises a current-sensing portion.

9. The multiphase power converter as recited in claim 8, wherein said current-sensing portion comprises a current sensing resistor with parasitic inductance in series with said current sensing resistor.

10. The multiphase power converter as recited in claim 8, wherein said current-sensing portion comprises:
    a resistor R;
    a capacitor C for a first phase of said multiphase power converter; and
    resistors R1 and R2 shared by said first phase of said multiphase power converter and a second phase of said multiphase power converter.

11. The multiphase power converter as recited in claim 10, wherein said current-sensing portion further comprises:
    a resistor divider to scale down sensed current or to compensate for temperature variation.

12. The multiphase power converter as recited in claim 1 further comprises:
    an isolated gate driving circuit for different switches.

13. The multiphase power converter as recited in claim 12, wherein said different switches comprise gallium nitride switches.

14. The multiphase power converter as recited in claim 1 further comprises:
    an isolated gate driving circuit for different transistors at different gate bias voltages with a range between −5 V to 20 V.

15. The multiphase power converter as recited in claim 14, wherein said transistors are metal oxide silicon field-effect transistors.

16. The multiphase power converter as recited in claim 1, wherein said at least one transformer comprises two grounded center-tapped rectifier transformers.

17. The multiphase power converter as recited in claim 1, wherein said at least one transformer comprises two ungrounded center-tapped rectifier transformers.

18. The multiphase power converter as recited in claim 1, wherein said series capacitor is in series with an inductor-inductor-capacitor resonant tank.

* * * * *